United States Patent [19]

Minovitch

[11] Patent Number: 4,754,601
[45] Date of Patent: Jul. 5, 1988

[54] SELF-REFUELING SPACE PROPULSION SYSTEM AND OPERATING METHOD

[76] Inventor: Michael A. Minovitch, 2832 St. George St., #6, Los Angeles, Calif. 90027

[21] Appl. No.: 683,039

[22] Filed: Dec. 18, 1984

[51] Int. Cl.⁴ .............................................. F02K 9/42
[52] U.S. Cl. ...................................... 60/204; 60/257; 60/266
[58] Field of Search ..................... 60/200.1, 202, 203.1, 60/204, 39.461, 39.465, 257, 259, 266

[56] References Cited

U.S. PATENT DOCUMENTS

| | | | |
|---|---|---|---|
| 3,410,092 | 11/1968 | Goldstein | 60/204 |
| 3,436,918 | 4/1969 | Brogan et al. | 60/203.1 |
| 3,561,217 | 2/1971 | Hall | 60/204 |
| 3,756,024 | 9/1973 | Gay | 60/204 |
| 3,886,733 | 6/1975 | Connell | 60/39.461 |

OTHER PUBLICATIONS

Gilmore, K. "Spaceplane", in *Science and Mechanics*, Nov. 1962, pp. 42–44 & 142.

*Primary Examiner*—Louis J. Casaregola
*Attorney, Agent, or Firm*—Christie, Parker & Hale

[57] ABSTRACT

A propulsion system for reusable space-based vehicles is presented wherein the propulsive working fluid is atmospheric gas. Acceleration or deceleration propulsion is obtained by expelling or ingesting atmospheric gas respectively. Consequently, propulsive working fluid expelled during accelerating forward propulsive maneuvers is automatically replenished during decelerating retro propulsive maneuvers. The refueling retro thrust is generated by a large diameter hypervelocity has inlet diffuser mounted at the front of the vehicle which scoops up atmospheric gas while traversing through the tenuous upper regions of a planet's atmosphere. The vehicle thereby transfers a portion of its momentum to the collected gas which was initially at rest in the atmosphere. This transfer of momentum generates a decelerating retro thrust by a reverse application of the theory of classical rocket propulsion. The collected gas is condensed, stored on-board the vehicle, and utilized as propulsive working fluid for generating forward propulsive accelerating thrust by expelling the gas at high velocity. The vehicle could operate either as a self-refueling interorbital transfer vehicle or as an interplanetary transfer vehicle moving from planet to planet utilizing each planetary atmosphere as propulsive working fluid.

61 Claims, 6 Drawing Sheets

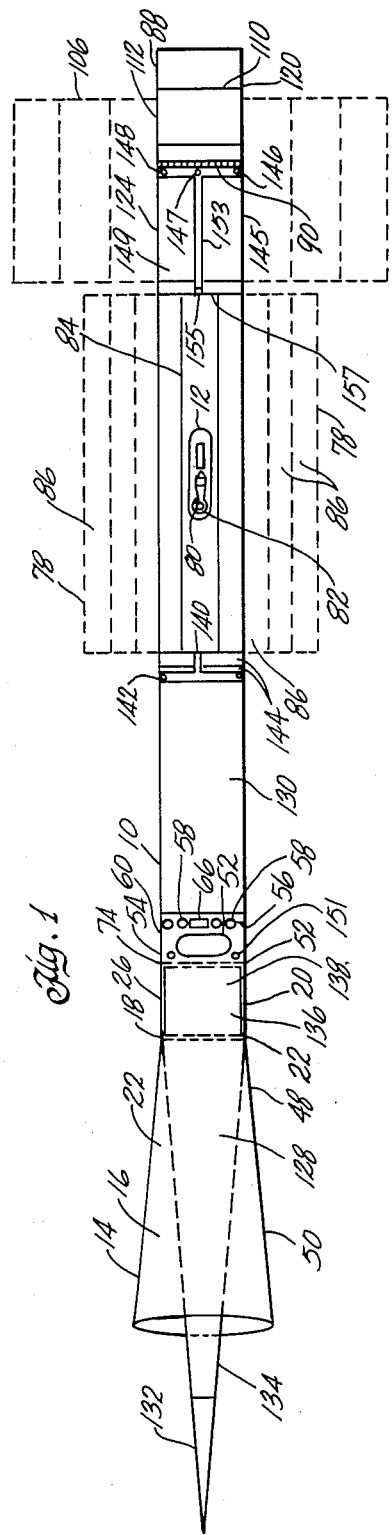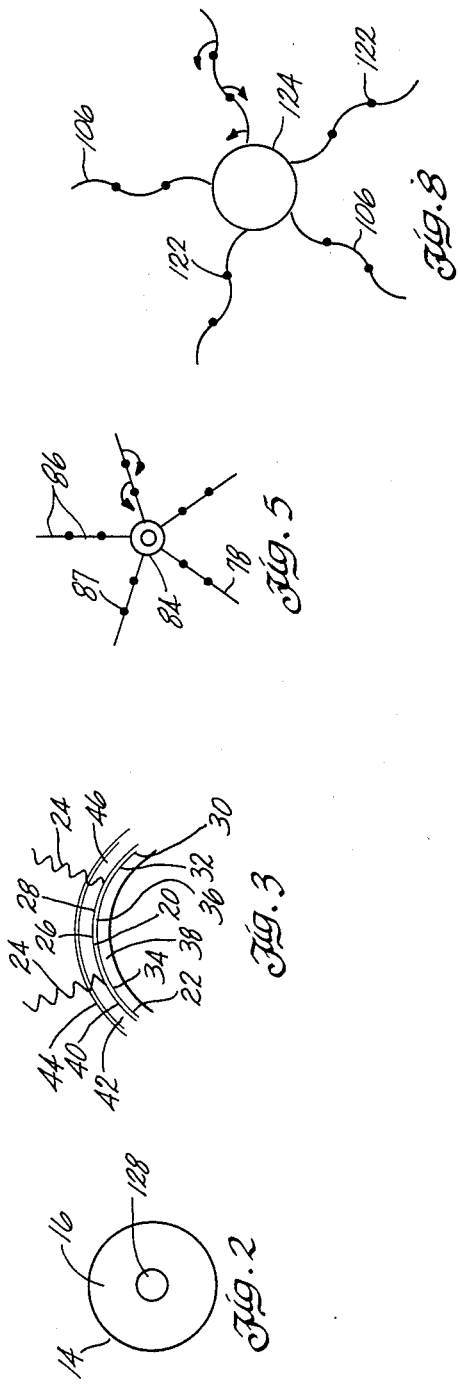

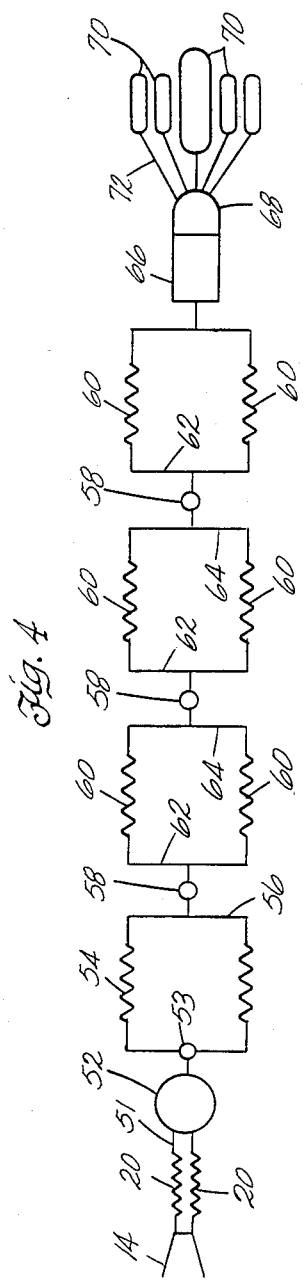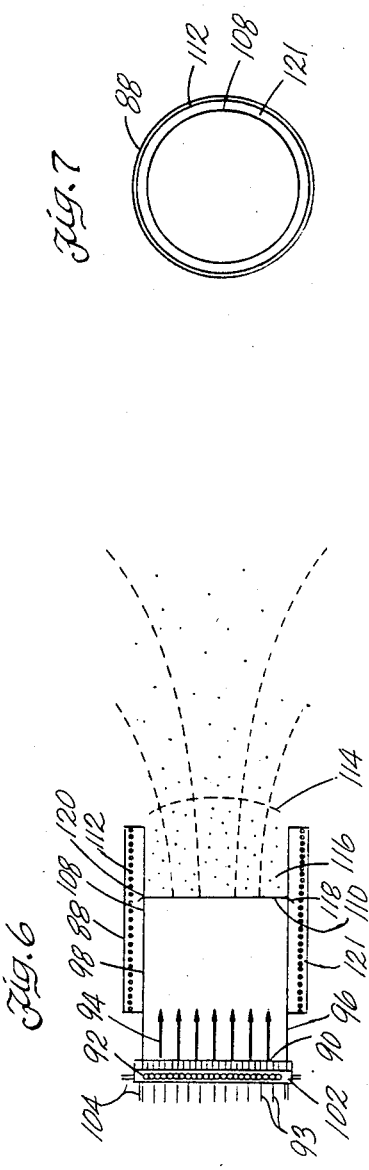

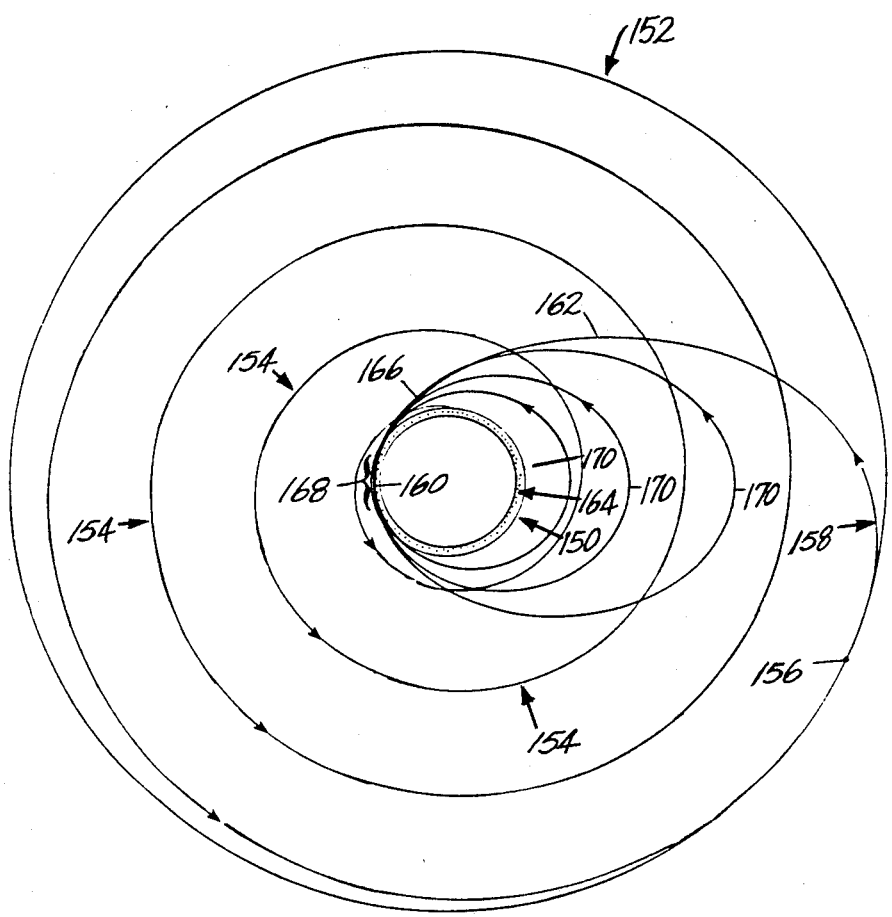

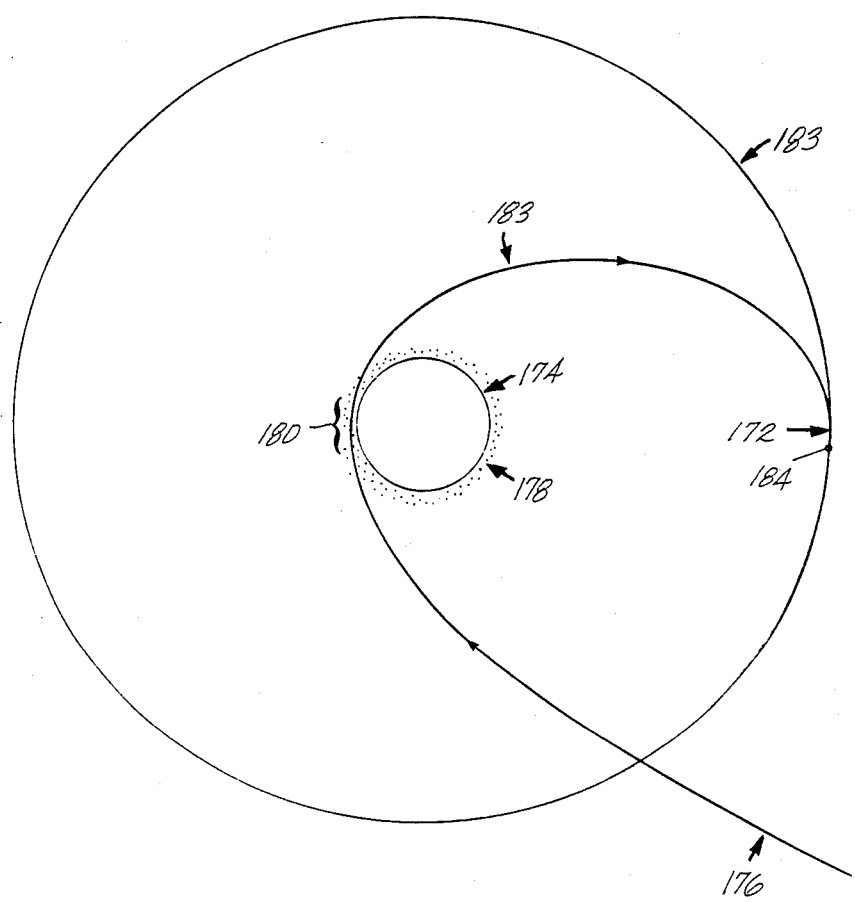

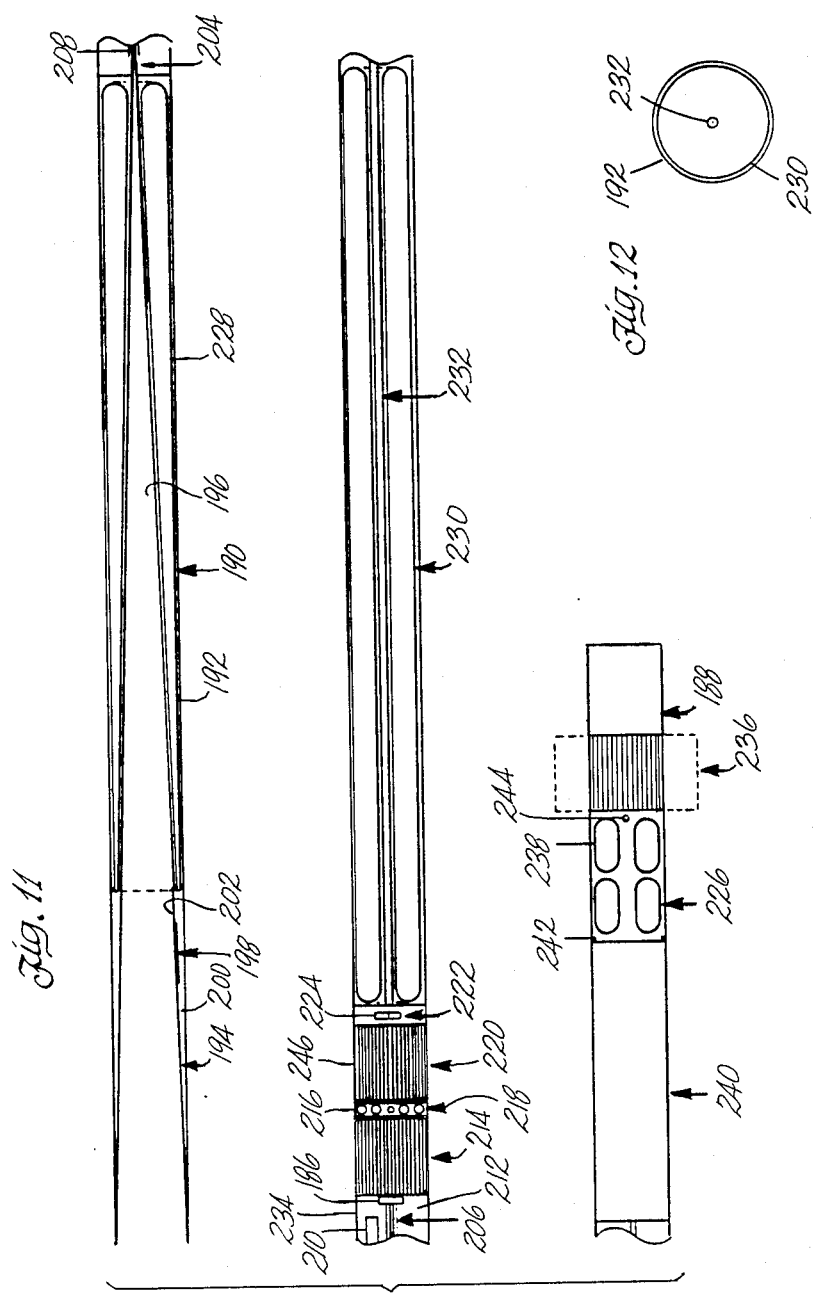

SELF-REFUELING SPACE PROPULSION SYSTEM AND OPERATING METHOD

BACKGROUND

The fundamental physical principle which all space vehicles utilize for propulsion is based on Newton's third law of motion: "For every action, there is an equal and opposite reaction." Thus, by expelling reaction mass (i.e., propellent) at high velocity u through an exhaust nozzle in one direction, a propulsive reaction thrust T is generated in the opposite direction. The magnitude of this thrust is given by $$T = \dot{m}u \tag{1}$$

where $\dot{m}$ denotes the mass flow rate at which the propellent leaves the exhaust nozzle. This is the fundamental principle which all prior art space propulsion systems use for generating accelerating or decelerating propulsive thrust. (Decelerating retro thrust is obtained by turning the vehicle around and expelling the propellent in the direction of motion.)

If $M_1$ and $M_2$ denote the total mass of a space vehicle before and after a propulsive maneuver to achieve a velocity change $\Delta V$, the "mass ratio" $M_1/M_2$ is related to $\Delta V$ by the well known "rocket equation" given by $$\frac{M_1}{M_2} = \exp(\Delta V/u) \tag{2}$$

Equations (1) and (2) are among the most important in astronautics because they essentially determine the capabilities and limitations of all space vehicles propelled by prior art propulsion systems. For example, since the total amount of propellent mass $m_p$ that must be carried on-board a space vehicle in order to achieve a total velocity change $\Delta V$ is given by $M_1 - M_2$, it follows from equation (2) that $$m_p = M_2[\exp(\Delta V/u) - 1] \tag{3}$$

Thus, the efficiency of a vehicle's propulsion system increases exponentially with increasing exhaust velocity.

Unfortunately, it is impossible to construct a chemical rocket engine that can produce an exhaust velocity greater than approximately 4.70 km/sec (which corresponds to a specific impulse of 480 sec). This limit is imposed by basic laws of thermodynamics that cannot be violated.

This limit on exhaust velocity has a profound effect on all chemical rockets and it is the principle reason why an Earth-to-orbit launch vehicle requires so much more propellent mass than payload mass. For example, in order to place a payload into a 200 km high circular low Earth orbit (LEO), a launch vehicle has to generate a total $\Delta V$ of about 13 km/sec (when atmospheric drag and gravity losses are taken into consideration). Hence, in view of equation (2), the lowest possible mass ratio for a single stage reusable chemical launch vehicle will be about 16.0. If the vehicle's dry mass is 150,000 kg and its payload mass is 30,000 kg, the required pre-launch propellent mass will be 2,880,000 kg. Thus, the payload mass is only 1.01% of the propellent mass.

Since the demands of reaching LEO by chemical rocket propulsion are so high, a reusable, single stage launch vehicle will not be capable of carrying out any significant amount of additional propulsive maneuvers after reaching LEO. Any payload requiring insertion into a higher energy orbit will be taken out of the launch vehicle in LEO and placed aboard a specially designed, reusable, space-based orbital transfer vehicle (OTV). The OTV will then take the payload from LEO and deliver it to the higher energy orbit. In the meantime, the launch vehicle is returned back to Earth where it is refueled and reloaded with another payload.

Most of the required higher energy orbits will be geosynchronous Earth orbit (GEO). If the thrust to weight ratio (T/W) of the loaded OTV is relatively high (e.g., >0.1 which is required for short flight times) the minimum $\Delta V$ required to reach GEO from a 200 km high LEO with an inclination of 28.6° is about 4.30 km/sec. Thus, a round trip mission from LEO to GEO and back to LEO will require a minimum $\Delta V$ of about 8.60 km/sec. If the drymass of a chemically propelled OTV is 30,000 kg, the initial propellent mass $m_p$ required to transport a 30,000 kg payload from LEO to GEO and return back to LEO with no payload (and empty fuel tanks) will be 202,000 kg. (In view of the required propellent mass, an OTV dry mass of 30,000 kg is very conservative because the mass of empty cryogenic storage tanks is usually 12% of the propellent mass that must be stored in them.) Since all of the propellent needed to operate the OTV must be transported up from the Earth's surface by ground-to-orbit launch vehicles, the total mass that must be transported up from the Earth's surface in order to place a 30,000 kg payload in GEO will be 232,000 kg. Thus, only 12.9% of the total mass brought up to LEO by the ground-to-orbit launch vehicles will be actual hardware payload. The remaining 87.1% of the mass will be propellent for the OTV. Since it was demonstrated that transporting any payload up to LEO from the Earth's surface is a very difficult and costly task and requires the expenditure of enormous quantities of propellent, the fact that about 87% of the total payload mass delivered to LEO must be wasted on propellent for the OTV makes the prospects for large scale commercial space travel beyond LEO using prior art propulsion systems very discouraging.

The above calculations show that in order to deliver payloads to GEO from LEO by chemically propelled reusable, space-based OTVs, almost all of the total mass that must be transported to LEO from the Earth's surface will be propellents for the OTVs. In fact, for missions to GEO by chemical OTVs, about 90% of the total weight lifting capability of the ground-to-orbit launch vehicle will be wasted by having to carry up the propellents for the OTVs. Only about 10% of the launch vehicle's total payload capability can be allocated for the actual hardware. This unfortunate situation is inherent in all chemical propulsion systems and is not likely to improve with future developments. Although electric propulsion systems do offer a substantial reduction in propellent requirements, they suffer from having inherently long flight times. Thus, for short flight time, high mass missions to GEO (such as manned flights) it appears that chemically propelled OTVs are necessary and unavoidable. This will inevitably result in burdening the ground-to-orbit launch vehicle with having to carry enormous quantities of liquid rocket propellents (for the OTVs) because the fuel-to-hardware mass ratio of the launch payload will be about 10 to 1.

For detailed technical information on prior art OTV studies, the reader is referred to the following references: (1) "Propulsion Options for Space-Based Orbital Transfer Vehicles," *Journal of Spacecraft & Rockets*, Vol. 16, No. 5, Sept–Oct. 1979 by J. J. Rehder et al; (2) "Orbit Transfer Propulsion and Large Space Systems," *Journal of Spacecraft & Rockets*, Vol. 17, No. 6, Nov–Dec. 1980, by K. E. Kunz; (3) "Preliminary Design for a Space-Based Orbital Transfer Vehicle," *Journal of Spacecraft & Rockets*, Vol. 17, No 3, May–June 1980, by I. O. Mac Conachie and J. J. Rehder; and (4) "Electric vs Chemical Propulsion for a Large-Cargo Orbit Transfer Vehicle," *Journal of Spacecraft and Rockets*, Vo. 16, No. 3, May–June 1979, by J. J. Rehder and K. E. Wurster.

Unfortunately, chemically propelled OTVs will essentially rule out the possibility of space flights to GEO by ordinary private citizens because they will be too expensive. For example, the minimum cost for transporting a 100 kg passenger from the Earth's surface to an orbiting geosynchronous space station via a chemical OTV will be about $1,000,000 (in 1980 dollars). There are not many private citizens who would be able or willing to pay this amount of money for a one-way trip to GEO. Since commercial flights to the Moon or into interplanetary space will be much more expensive than trips to GEO, they will be economically impossible for ordinary private citizens. Thus, for all practical purposes, large scale commercial space travel beyond LEO will be an economic impossibility using prior-art propulsion systems.

In an attempt to circumvent the fundamental problem of having to transport huge quantities of chemical propellants up from the Earth's surface to support chemical OTVs, Gerard O'Neill proposed constructing a base on the Moon, extracting oxygen from Moon rocks, and transporting it to the OTVs from the Moon's surface instead. (See, "The Colonization of Space," *Physics Today*, Sept. 1974, pp. 32–40.) According to this plan, only the hydrogen component of the propellants would have to be transported up from the Earth's surface. Consequently, since the oxygen-to-hydrogen mass ratio for chemical $O_2/H_2$ rocket engines is 8 to 1, the process of having to bring up only the hydrogen component for the OTVs, reduces the total propellant mass that would otherwise have to be transported up from the Earth's surface by a factor of 8. Unfortunately, the problems of maintaining a Moon base, extracting oxygen from Moon rocks, and transporting it from the Moon's surface to the OTVs, introduces operational complexities that turn out to be very costly. (See, "Should We Make Products On The Moon," *Astronautics & Aeronautics*, June 1983, pp. 80–85 by W. F. Carroll et al). This proposal for solving the propellant refueling problem of chemically propelled OTVs by extracting oxygen from Moon rocks demonstrates the magnitude of the problem and the extraordinary lengths engineers are willing to go in an attempt to circumvent it.

The solution to the refueling problem of OTVs proposed herein by the applicant is radically different from all others in the prior art in that it is based on setting forth a fundamentally new propulsion concept for propelling any reusable space-based vehicle—whether it is an interorbital transfer vehicle moving around the Earth or an interplanetary transfer vehicle moving around the solar system. This propulsion concept is based upon utilizing the atmosphere of a planet as propulsive working fluid and designing the propulsion system to be self-refueling. This is accomplished by first recognizing three simple facts: (1) a reusable space-based vehicle requires just as many decelerating retro propulsive maneuvers as accelerating propulsive maneuvers; (2) that any propulsive maneuver will be more efficient if applied when the vehicle is moving closest to the central body when its velocity is maximum; and (3) that most of the required decelerating retro maneuvers can be generated by a reverse application of the fundamental theory of rocket propulsion by dipping into and ingesting atmospheric gas instead of expelling gas. The third fact represents the most important and the most far-reaching observation. Thus, instead of generating decelerating retro thrust by the usual method of expelling gas through a rocket nozzle pointed in the direction of motion, the proposed system ingests gas through a diffuser intake nozzle pointed in the direction of motion while the vehicle passes through the upper regions of a planet's atmosphere. The vehicle thereby transfers a large portion of its initial momentum to the collected gas which was initially at rest in the upper atmosphere This transfer of momentum provides the vehicle with a free decelerating retro thrust by a reverse application of the theory of classical rocket propulsion.

By designing the intake diffuser nozzle to have a maximum diameter greater than the vehicle's diameter, all aerodynamic drag effects are essentially eliminated and the magnitude of the retro thrust can be calculated by a reverse application of equation (1). In this case the propellant mass flow rate $\dot{m}$ refers to the intake mass flow rate $\dot{m}_{in}$ of atmospheric gas scooped up and ingested by the vehicle, and the flow velocity u refers to the gas inlet velocity $u_{in}$. The gas inlet velocity $u_{in}$ is equal to the vehicle's instantaneous velocity relative to the passing planet. It can be approximated by the vehicle's perigee velocity (when its altitude is minimum)

The vehicle's velocity change $\Delta V = V_1 - V_2$ can be calculated by applying the principle of conservation of momentum. Hence, if $M_1$, $V_1$ and $M_2$, $V_2$ denote the vehicle's total mass and velocity before and after scooping up an amount of gas $m_p = M_2 - M_1$ respectively, then $M_1 V_1 = M_2 V_2$. Consequently, the mass ratio is given by $$\frac{M_1}{M_2} = \frac{V_2}{V_1} \tag{4}$$

Notice that in this case, the mass ratio $M_1/M_2$ is always less than 1 (because $M_2 > M_1$) and that in order for $V_2 \to 0$, $M_2 \to \infty$. Equation (4) represents the analogue of the basic rocket equation (2) where $M_2 < M_1$ (since, in this equation, the propellant mass is expelled instead of being ingested.) In deriving equation (4), the gravitational effects are omitted for simplification.

The retro velocity change $\Delta V = V_1 - V_2$ is given by $$\Delta V = V_1 \left( 1 - \frac{M_1}{M_2} \right) \tag{5}$$

and the amount of propellant gas $m_p$ ingested during the gas scooping retro maneuver is given by $$m_p = M_1 \left( \frac{V_1}{V_2} - 1 \right) \tag{6}$$

Equation (6) is the analogue of equation (3).

The atmospheric gas enters the vehicle through the intake diffuser nozzle, cooled, liquefied and stored cryogenically on-board the vehicle. The vehicle uses the collected atmospheric gas as its propulsive working fluid to generate accelerating forward thrust by expelling the gas at high velocity $u_{out}$ via the usual application of the theory of classical rocket propulsion. It follows directly from equations (3) and (6) that if the exhaust velocity $u_{out}$ can be made to exceed the maximum inlet velocity $u_{in} = V_1$, the vehicle will become self-refueling. Consequently, the gas expended during the vehicle's forward accelerating maneuvers is automatically replenished by the incoming gas during the vehicle's decelerating retro maneuvers.

The crucial operating condition $u_{out} > u_{in}$ can be satisfied by employing a high power electromagnetic propulsion system. Several different types can be used and are generally known as high power plasma accelerators. The most popular of these are referred to as magnetohydrodynamic (MHD) accelerators and magnetoplasmadynamic (MPD) accelerators. However, there is one relatively unknown class of plasma accelerators that is ideally suited for the proposed self-refueling propulsion system. They are called electron cyclotron resonance (ECR) accelerators. Although these accelerators are powered by microwaves, they can be used to accelerate any ionized gas to very high exhaust velocities with very high power densities. Thus, it is possible to design a high power ECR accelerator that can be used to accelerate a multitude of different gases. Although some gases will be more efficient to use than others because of their different ionization potentials, all of the gases found on all of the planets can be accelerated by a suitably designed ECR accelerator. Since nitrogen has a relatively low ionization potential, it will be an ideal working fluid for an ECR accelerator system. Thus, since nitrogen represents the major portion of the Earth's atmosphere (76.7%), a self-refueling propulsion system will operate very efficiently for Earth-based reusable OTVs.

The application of the proposed self-refueling propulsion system (that is based on a generalized theory of classical rocket propulsion) is ideally suited for large manned reusable space-based OTVs orbiting the Earth, as well as for manned reusable interplanetary vehicles moving from planet to planet. Since no rocket propellents have to be transported up from the Earth's surface (or from the surface of any other celestial body) to refuel these vehicles, the concept represents a revolutionary propulsion breakthrough in achieving economical commercial space travel throughout the entire solar system.

BRIEF SUMMARY OF THE INVENTION

Thus, in the practice of this invention according to a presently preferred embodiment, there is provided a self-refueling propulsion system for propelling reusable, space-based vehicles from one orbit to another orbit around one planet (OTVs), or from one planet to another planet (planetary transfer vehicles PTVs). The propulsive working fluid can be any reasonably dense atmospheric gas that surrounds a planet or satellite thereof. All planets in the solar system, with the possible exception of Pluto, have atmospheres that can be used as working fluids.

In the preferred embodiment, the propulsion system comprises a large diameter hypermelocity gas intake diffuser mounted on the front of a space vehicle designed for scooping up and ingesting atmospheric gas for generating decelerating retro propulsion, and a single high power ECR accelerator mounted at the rear of the vehicle designed for accelerating and expelling atmospheric gas for generating foward accelerating propulsion. The ingesting process is accomplished by allowing the vehicle to dip into the upper regions of an atmosphere when a retro decelerating propulsive maneuver is required. The ingested atmospheric gas is liquefied and stored cryogenically on-board the vehicle for later use during accelerating propulsive maneuvers when it is fed into the ECR accelerator and expelled at high exhaust velocity. The exhaust velocity is designed to exceed the intake velocity so that the vehicle is essentially self-refueling.

In the preferred embodiment the ECR accelerator is powered by high power microwave generators drawing DC electric current from an on-board nuclear-electric generating system. This generating system is a high-temperature, closed-cycle, gas-core, MHD power plant operating with a Rankine thermodynamic cycle and capable of generating several gigawatts of continuous output power. The specific mass is assumed to be 0.03 kg/KW.

The self-refueling propulsion system is capable of propelling manned vehicles with high mass payloads on the order of $10^6$ kg from LEO to GEO with very short flight times. It is also capable of propelling manned vehicles on high speed hyperbolic interplanetary trajectories throughout the entire solar system. The gas collected from one planet during the refueling retro capture maneuver will provide the propulsive working fluid needed to accelerate it away from the planet and propel it onto a high-speed hyperbolic interplanetary trajectory to another planet, where it carries out another refueling retro maneuver. Thus, a single manned reconnaissance vehicle equipped with the self-refueling propulsion system disclosed herein, could make a whole series of high-speed interplanetary flights from one planet to another planet that includes going into actual parking orbits at each planet. By carrying only a few thousand kilograms of enriched nuclear fuel for operating the on-board power plant, a vehicle equipped with a self-refueling propulsion system could travel around the entire solar system, exploring the planets from planet to planet for several years without ever having to return to Earth for refueling.

The disclosure also includes several alternative embodiments of self-refueling propulsion systems. Some of these alternative embodiments incorporate a high-power superconducting MHD electric generator mounted at the end of a suitably designed gas inlet nozzle. This generator is designed to decelerate the incoming gas by magnetic forces and convert its directed kinetic energy into electrical energy. The decelerating gas generates a recoil force on the superconducting magnet and produces the desired retro thrust. The electrical energy that is generated is fed into a large on-board superconducting energy storage system and used later for powering the ECR accelerator during accelerating propulsive maneuvers. Thus, in these emdobiments, the propulsion system is not only self-refueling, but self-energizing as well. It is a "regenerative propulsion system".

A self-refueling propulsion system designed for OTVs, orbiting the Earth will use nitrogen for the ECR accelerator. By adjusting the exhaust velocity of the ECR accelerator according to the payload mass for each mission, it is possible to operate the propulsion system with equal nitrogen-in to nitrogen-out mass flow ratios. This will result in the accumulation of large quantities of excess oxygen because approximately 23% of the ingested air will be oxygen which is not used by the ECR accelerator This excess oxygen could be used aboard relatively small $LO_2/LH_2$ chemically propelled rocket vehicles using hydrogen brought up from the Earth's surface. These chemically propelled vehicles could be reusable lunar or planetary landing vehicles that could be carried aboard large transfer vehicles equipped with self-refueling propulsion systems. Since the $LO_2$ to $LH_2$ mass ratio for these chemical rocket engines is 8 to 1, the process of having to bring up only the hydrogen component of the $LO_2/LH_2$ propellent reduces the total mass that would ordinarily have to be transported up from the Earth's surface to refuel these vehicles by a factor of 9. Moreover, since these vehicles are only small landing excursion modules operating between a self-refueling mother ship (circling in a low parking orbit) and the lunar surface (or the surface of some other celestial body) the total $LO_2/LH_2$ propellent requirements will be low. Thus, the required mass of $LH_2$ that has to be brought up from the Earth's surface inside a ground-to-orbit launch vehicle will be very low. Nevertheless, even this small amount of $LH_2$ fuel will enable actual manned landing and exploration missions to be conducted on the surface of almost any celestial body in the entire solar system.

The applicant believes that the self-refueling propulsion system disclosed herein will open the door to inter-orbital and interplanetary space travel on a scale previously considered only in the realm of science fiction. It would enable the economic construction of large permanent lunar bases, extensive manned interplanetary landing missions to the various planets and their satellites, and low cost commercial interplanetary space travel for ordinary citizens.

DRAWINGS

These and other advantages and features of the invention will be apparent from the disclosure, which includes the specification with the foregoing and ongoing description, the claims, and the accompanying drawings wherein:

FIG. 1 is a schematic longitudinal cross-section illustrating the design and construction of the preferred embodiment of a self-refueling propulsion system mounted inside a space vehicle;

FIG. 2 is a transverse cross-section of the intake diffuser shown in FIG. 1;

FIG. 3 is an enlarged schematic transverse cross-section through a portion of the annular hot gas radiation chamber of the inlet diffuser;

FIG. 4 is a block diagram illustrating the design and operating principles of the atmospheric gas cooling and liquefaction system;

FIG. 5 is a schematic transverse cross-section illustrating the design and construction of a plurality of fold-out high temperature radiator panels for the nuclear-electric power plant;

FIG. 6 is a schematic longitudinal cross-section of a high power electron cyclotron resonance accelerator;

FIG. 7 is a schematic transverse cross-section through the end of the vehicle illustrating the exhaust duct of the ECR accelerator;

FIG. 8 is a schematic cross-section through FIG. 1, illustrating the design and construction of a plurality of swing-out low temperature space radiators for the high power microwave generators;

FIG. 9 is a typical round-trip trajectory for a self-refueling vehicle transporting a high mass payload from LEO to GEO on a spiraling accelerating propulsive trajectory, and back to LEO using high thrust decelerating retro propulsion generated by dipping into and ingesting portions of the Earth's atmosphere which automatically refuels the vehicle for the next trip back to GEO;

Figure 14:
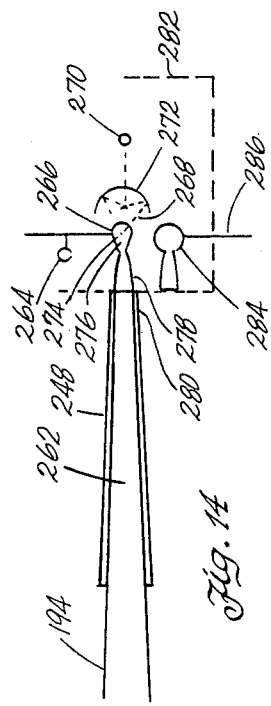
Figure 15:
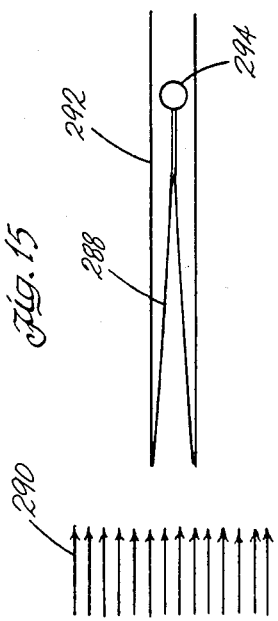
Figure 13:
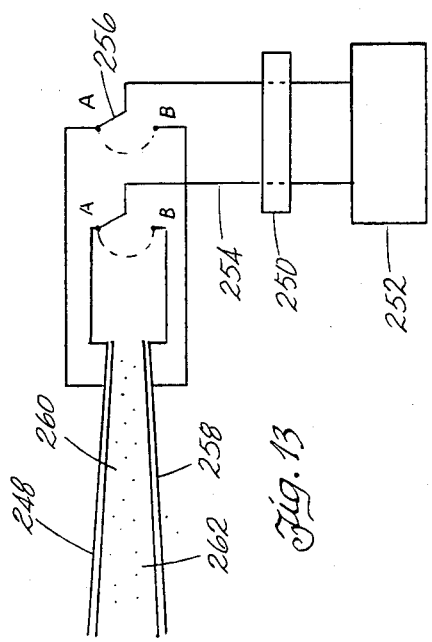

FIG. 10 shows the trajectory of a self-refueling vehicle on a high speed interplanetary mission to Io (the second satellite of Jupiter) as it approaches Jupiter on a hyperbolic trajectory and executes a high thrust retro propulsive maneuver by passing through and ingesting portions of Jupiter's atmosphere thereby refueling the vehicle and sending it on to a low energy elliptical encounter trajectory with Io;

FIG. 11 is a schematic longitudinal cross-section illustrating the design and construction of a regenerative self-refueling propulsion system mounted inside a space vehicle;

FIG. 12 is a transverse cross-section through the main toroidal superconducting energy storage coil illustrating its design and showing the connecting tunnel passing through its central axis;

FIG. 13 is a schematic block diagram illustrating the operating principles of an MHD generator/accelerator system;

FIG. 14 is a longitudinal schematic diagram illustrating the design and construction of a microwave powered plasma generator and injection system; and FIG. 15 is a schematic diagram illustrating the basic operating principles of a retro propulsion system designed for decelerating a vehicle moving through any fluid medium.

DESCRIPTION OF THE PREFERRED EMBODIMENT

The purpose of the present invention is to provide a space-based, reusable transfer vehicle with a propulsion system that is self-refueling. Since such a system is impossible to achieve within the prior art theory of rocket propulsion, a generalized theory of rocket propulsion was developed. This generalized theory provides the theoretical foundation and operating principles upon which the proposed self-refueling propulsion system is based.

The prior art theory of rocket propulsion is based upon Newton's third law of motion. This law states that: "For every action there is an equal and opposite reaction." In the prior art theory of rocket propulsion, a rocket engine generates propulsive thrust by one and only one method—expelling gas at high velocity through an exhaust nozzle (or through an exhaust duct). Thus, with respect to Newton's third law of motion, the action generated by prior art rocket engines is always represented by the process of expelling gas. The reaction is represented by the appearance of propulsive thrust directed in the opposite direction. This same thrust generating process is applied whether accelerating forward propulsion, or decelerating retro propulsion is required. If dedecelerating retro propulsion is required, the vehicle is simply turned around and the rocket engine is fired to expel the gas in the direction of motion. Unfortunately, this prior art theory of rocket propulsion results in the eventual depletion of the vehicle's propulsive working fluid and the vehicle must be periodically refueled by large quantities of new propellents brought up from the Earth's surface at great expense. This theory is so entrenched in the prior art of space travel that it is viewed essentially as axiomatic and never seriously challenged. Efforts to improve the operating efficiency of prior art rocket propulsion systems are directed towards increasing the exhaust velocity. But the basic theory of generating thrust by expelling propellent is never challenged. (Aerodynamic breaking is not considered to be part of a space vehicle's propulsion system.)

The generalized theory of rocket propulsion disclosed herein is based upon a generalized application of Newton's third law of motion. In this theory, accelerating forward thrust and decelerating retro thrust are generated by exactly opposite processes. Accelerating forward thrust is generated by expelling gas through an exhaust nozzle according to the usualy theory of rocket propulsion. However, decelerating retro thrust is generated by ingesting gas through an intake diffuser by an exactly opposite process. Although both thrust generating processes are based upon Newton's third law of motion, the action generating retro thrust is represented by ingesting gas initially at rest outside the vehicle, instead of expelling gas initially at rest inside the vehicle. The source of the ingested gas comes from the natural atmosphere surrounding the planet around which the vehicle is moving.

The retro thrust is initiated by letting the vehicle dip down into the tenuous upper reaches of a planet's atmosphere. The vehicle traverses through the atmosphere ingesting the gas into the retro propulsion system which generates decelerating retro thrust by exchanging momentum. Thus, the ingested atmospheric gas serves as propulsive working fluid for the retro propulsion system. The planetary atmosphere therefore represents an essentially infinite reservoir of working fluid that is stored outside the vehicle (instead of inside the vehicle) that can be used for making an unlimited number of retro propulsive maneuvers. After the working fluid is used for a retro propulsive maneuver (by ingesting it) it is cooled, liquefied and placed inside cryogenic storage tanks. This ingested decelerating propulsive working fluid is then utilized as accelerating propulsive working fluid by expelling it at high velocity, thereby generating accelerating forward thrust. Since the vehicles using the system are considered to be space-based, reusable transfer vehicles, the magnitude of the required decelerating propulsive maneuvers (negative $\Delta V$) will always be approximately equal to the magnitude of the accelerating propulsive maneuvers (positive $\Delta V$) for each round-trip mission that begins and ends in the same initial orbit. Thus, there will always be enough refueling retro maneuvers on each round-trip mission to replenish the working fluid expelled during the accelerating propulsive maneuvers. Consequently, by utilizing the same working fluid for the decelerating and accelerating propulsion systems, and by expelling the gas with an exhaust velocity exceeding the inlet velocity, the propulsion system becomes self-refueling.

This generalized theory of rocket propulsion provides the basic theoretical operating principles upon which the proposed self-refueling propulsion system is based. The remainder of this specification will be devoted to translating this self-refueling theory of rocket propulsion into actual hardware.

The most important operating system that will make a self-refueling space vehicle realizable is the accelerating propulsion system. It must be capable of accelerating almost any gaseous substance to extremely high velocities. Unless the exhaust velocity exceeds the intake velocity, the vehicle cannot become self-refueling. This crucial operating condition can be achieved however, by utilizing a high power ECR accelerator with superconducting drive coils. One giant ECR accelerator will provide an ideal accelerating propulsion system. Since ECR accelerators are essentially electrical, they can be used in principle to accelerate any ionized gas to very high exhaust velocities with very high thrust and power densities. Thus, it is possible to design an ECR accelerator that can be used to accelerate a multitude of different gases. Although some gases will be more efficient to use than others because of their different ionization potentials, all of the gases found on all of the planets can be accelerated by a suitably designed ECR accelerator. Since nitrogen has a relatively low ionization potential, it will be an ideal working fluid for an ECR accelerator. Thus, since nitrogen represents the major portion of the Earth's atmosphere, a self-refueling propulsion system will operate very efficiently for an Earth-based reusable orbiting transfer vehicle.

The present disclosure describes several different vehicle and propulsion system designs that can be used to construct a self-refueling space vehicle. The preferred embodiment is based upon using a relatively small, but powerful, on-board nuclear-electric power generating system with a specific mass on the order of 0.03 kg/KW and capable of generating over 3,500 megawatts of continuous electric power over extended time periods. In order to take advantage of the favorable scaling laws, all of the self-refueling vehicle designs presented herein will be very large—exceeding 200 m (656 ft) in overall length. This may be an unavoidable design feature of all self-refueling vehicles. However, this is not considered to be a serious disadvantage because, once constructed, they would not have to be refueled by propulsive working fluid that would ordinarily have to be transported up from the Earth's surface inside ground-to-orbit launch vehicles at great expense. Consequently, unlike all previous space vehicles, the proposed self-refueling vehicle is not mass sensitive. Its great size will enable it to transport enormous payloads to GEO, or to the Moon, or even to other planets anywhere in the entire solar system.

The on-board power plant selected for the preferred embodiment will be a closed-cycle gas core MHD generator system using a high temperature Rankine thermodynamic cycle with a net output of 3,500 MW and a specific mass of 0.03 kg/KW. These power plants (with even lower specific masses) have been investigated in the literature and there appears to be no fundamental technological reasons precluding their development. For detailed technical information on these power plants, the reader is referred to the paper, "Ultra-Performance Closed-Cycle Gas Core Reactors for Orbit Raising," *Orbit-Raising And Maneuvering Propulsion: Research Status and Needs,* Vol. 89, Progress in Astronautics and Aeronautics, 1984, pp. 460–476, by R. J. Rosa and L. N. Myrabo. (This paper also contains a list of other references describing high power nuclear-electric power plants.)

Since the production of energy is of no particular concern in the preferred embodiment, the most critical problem concerns its dissipation. In particular, the design of the hypervelocity gas-inlet diffuser of the decelerating retro propulsion system presents an extremely difficult problem because of the enormous temperatures that are generated in the throat region. Essentially all of the kinetic energy of the gas entering the diffuser is converted into thermal energy as it leaves the diffuser. Thus, for Earth orbital operations between LEO and GEO, the maximum incoming gas stream will be moving on the order of 10 km/sec, corresponding to a specific energy of $5 \times 10^7$ Joules/kg. Essentially all of this energy is converted into thermal energy when the gas leaves the diffuser thereby generating extremely high stagnation temperatures on the order of 20,000° K. All of this thermal energy must be extracted without melting the surrounding structure before the atmospheric gas can be liquefied. The solution to this problem was found by employing a novel diffuser geometry and extracting the thermal energy by direct radiation into space. The design and construction of this gas intake and radiation system represents the heart of the decelerating retro propulsion system for the preferred embodiment It is therefore one of the most important features of the present invention.

FIG. 1 is a schematic longitudinal cross-section of the preferred embodiment of a self-refueling space vehicle 10 drawing power from an on-board high power nuclear-electric generating system 12. The gas intake 14 is conical in shape but folded back into itself to form an annular duct 16. FIG. 2 is a transverse cross-section of the intake diffuser 14 further illustrating its design and construction. This fold-back design feature is very important because it enables the throat 18 of the diffuser 14 (where the gas temperature is maximum) to have a narrow annular shape extending completely around the vehicle's transverse circumferential periphery. By extending the transverse region of the throat 18 several meters toward the rear of the vehicle 10, a narrow annular hot gas sleeve-like chamber 20 is obtained.

Since the temperature of the atmospheric gas 22 entering the chamber 20 is extremely high, it is incandescent and almost all of the radiation 24 is at optical wave lengths. The walls 26 of the chamber are constructed with a relatively thin, high-temperature, transparent medium 28 such as fused silica glass. FIG. 3 is an enlarged schematic transverse cross-section through a portion of the annular hot gas radiation chamber 20 illustrating its general design and construction. The outside surface of of the inside wall 30 of the transparent wall 26 is coated with a thin layer of highly reflective material 32 such that essentially all of the radiation 24 falling on the inside walls 34 is reflected outward into space.

The outside portion 36 of the reflecting surface 32 is maintained in direct thermal contact with large quantities of circulating coolant 38 which keeps the inside walls 34 of the annular hot gas radiation chamber 20 relatively cool. This inner coolant 38 is pressurized to prevent the inner walls 34 of the chamber 20 from collapsing inward under the pressure of the hot gas 22. The outside walls 40 of the radiation chamber 20 are surrounded by a larger annular cavity 42 bounded on the outside by a relatively thick transparent cylindrical wall 44. As shown in FIG. 3, a transparent, pressurized outer coolant 46 is circulated through the outer cavity 42, thereby cooling the relatively thin outer transparent wall 40 of the hot gas radiation chamber 20 and preventing it from expanding outward under the gas pressure.

Since the annular hot gas radiation chamber 20 has a very large surface area, and since the radiative heat loss of the gas is proportional to $T^4$, where $T \approx 12,000°$ K, it follows that this design is capable of handling and radiating away huge quantities of incoming thermal power directly into space. For example, if the throat diameter is 14 m, and if the radiation chamber 20 is 12 m long, a heat flux of 10 KW/cm$^2$ (which could be easily handled by the chamber walls 26) would provide 52,000 MW of radiative heat transfer.

The basic design principles of this radiating chamber and heat transfer system are similar to those used in the so-called nuclear "light bulb" rocket engine. (See, *Research On Uranium Plasmas And Their Technological Applications*, Session V, Nuclear Light Bulb Engine, pp. 285–312, NASA SP-236, 1971.) However, in the present case, the object is to cool the gas by radiative heat transfer rather than heat it as in the nuclear Light Bulb engine.

Large portions 48 of the diffuser 14 near the throat region are also made transparent to help radiate the thermal energy. The entire outer surface 50 of the diffuser 14 is designed as a black body radiator with an emissivity exceeding 0.9 in order to radiate as much heat as possible. Since the total area of the diffuser's outer surface 50 is very large, this radiator will contribute a relatively high proportion of the total heat loss. (For example, if the diffuser is 48 m long with an inlet diameter of 22 m and a throat diameter of 14 m, its external surface area will be 2,724 m$^2$. If, during a refueling retro maneuver, its average temperature climbs to 1,650° K. (1,377° C.) and its emissivity is 0.9 it will be able to radiate heat energy at a rate of about 1,140 MW.)

After the atmospheric gas passes through the radiation chamber 20, it is withdrawn at a significantly lower temperature (on the order of 1,600° K.) via thermally insulated conduits 51 and fed into a large thermally insulated load leveling temporary holding tank 52 with a volume capacity on the order of 500 m$^3$. Hot gas is continuously withdrawn from this tank 52 via turbocompressors 53 and fed into a high-temperature space radiator system 54, where it is further cooled. The gas is withdrawn from this secondary radiator system 54 at a temperature of about 500° K via conduits 56 and fed into a plurality of serially connected turbocompressors 58. A high temperature space radiator is interposed between adjacent turbocompressors 58 as shown in the block diagram of FIG. 4.

Each turbocompressor 58 in the series is designed to isentropically compress the gas with a pressure ratio such that the outlet gas temperature is about 1,000° K. The heated compressed gas is then fed into the adjacent high temperature space radiator 60 via conduits 62, where it is cooled back to about 500° K. It is then fed into the next turbocompressor 58 via conduit 64 and the process is repeated. Since the gas pressure is always significantly increased after passing through each turbocompressor/radiator stage, but always cooled back to about 500° K, the entropy of the gas is significantly reduced after passing through each stage. This system of serially connected turbocompressors 58 and space radiators 60, therefore represents a powerful high speed gas pre-liquefaction system that is capable of continuously reducing the entropy of large quantities of incoming gas.

The gas emerges from the last radiator 60 with a temperature and pressure equal to about 500° K and 500 Atm respectively. It is then fed into a high speed gas liquefaction system 66 where it is liquefied. Since the entropy of the gas entering the liquefyer 66 is much lower than ordinary air at standard temperature and pressure, it is easily liquefied. The various component gases contained in the ingested atmospheric gas (such as $N_2$, $O_2$, $CO_2$, A, Ne, $H_2$, Kr, He, etc., if the gas were air) are separated out (via fractional distillation) by a separator 68 and fed into their respective cryogenic storage tanks 70 via conduits 72. Those gases that are not useful are accumulated and removed from the vehicle. Only those liquefied gases that are suitable as working fluids for the ECR accelerator system, or useful in other respects, are saved. For Earth-orbital operations, all of the oxygen is saved and the nitrogen is used for the ECR accelerator system. Small quantities of helium are also accumulated and used for the on-board superconducting coils and related cryogenic systems.

Since the composition of the Earth's atmosphere at high altitudes (e.g., 100 km) contains a fairly high percentage of $H_2$, this $H_2$ will combine with the $O_2$ to produce water. This water can be separated from the other gases during the cooling and liquefaction process. It could be separated into $O_2$ and $H_2$ by electrolysis, liquefied, and stored inside their respective cryogenic storage tanks. Consequently, refueling retro maneuvers in the Earth's atmosphere will also produce small quantities of $H_2$ that could be used as fuel for chemical $LO_2/LH_2$ rocket engines.

Since each refueling retro maneuver lasts only a few minutes (e.g., 5 to 10 minutes for Earth based OTVs) the gas liquefaction process is not usually completed until long after the refueling retro maneuver is over. This is because there is no particular need to complete the liquefaction in a short time period and because the space radiators will operate more efficiently after the vehicle leaves the atmosphere and re-enters a space environment. When the vehicle is traversing through the tenuous upper regions of the atmosphere during a refueling retro maneuver, the tip of the rim around the inlet diffuser will generate a truncated conical shock wave that completely envelops the entire vehicle. This will generate a high temperature environment around the vehicle that reduces the radiative heat loss of the radiators. However, this effect can be minimized by designing the rim to have an extremely sharp, knife-like, edge and shaped such that most of the shock wave is directed inside the diffuser's annular inlet duct. Thus, as the outer shock wave expands outward away from the vehicle, its intensity drops off very rapidly. Moreover, since the retro maneuvers take place at extremely high altitudes where the density of the atmosphere is very low, the shock waves that do form around the vehicle will not be very intense.

In some situations, it may not be desirable to liquefy and keep any of the atmospheric gas entering the diffuser during a retro deceleration maneuver. Thus, a plurality of by-pass exhaust ducts 74 (FIG. 1) are provided for expelling some or all of the incoming gas directly back into space after withdrawing it from the radiation chamber 20. These by-pass exhaust ducts 74 are movable such that the hot gas can be exhausted toward the front of the vehicle or toward the rear of the vehicle thereby enabling the total retro thrust to be increased or decreased respectively. It also enables the vehicle to control its pitch, yaw and role as it traverses through the atmosphere thereby providing directional control.

In reviewing the above description with reference to FIGS. 1 and 4, it is apparent that the refueling retro propulsion system comprises the hypervelocity inlet diffuser 14, the annular radiation chamber 20 (and all of its cooling systems), the high temperature space radiators 54,60, the turbocompressors 58, the gas liquefaction system 66, and the by-pass exhaust ducts 74.

As shown in FIG. 1, the 3,500 MW nuclear-electric power plant 12 is mounted at the center of a large array of high temperature space radiators 78. The reactor 80 is surrounded by a shield 82 to contain nuclear radiation. The entire power plant 12 (excluding the radiators 78) is enclosed within a 60 m (196.9 ft) long, 6 m (19.7 ft) diameter cylindrical pressure hull 84 to allow routine maintenance by the vehicle's crew while the power plant 12 is operating.

The radiator array consists of five large fold-out high temperature, two-sided radiator panels 78 mounted at 72° intervals around the cylindrical power plant housing 84. FIG. 5 is a schematic transverse cross-section further illustrating the design and construction of the fold-out radiator panels 78. When the vehicle 10 is passing through the upper atmosphere during a refueling retro maneuver, the outer panel sections 86 are maintained in a retracted folded-in position to protect them from the surrounding hypervelocity atmospheric gas. They are extended, via longitudinal hinges 87 only when the nuclear power plant 12 is operating. However, they are maintained in a retracted position most of the time while the vehicle is moving on a free-fall ballistic trajectory. Each panel 78 is 60 m (196.9 ft) long and 4 m (13 ft) wide. Consequently, the total radiating surface area is 9,600 m$^2$(103,333 ft$^2$). The average radiator temperature is 1,640° K (1,367° C.). Based on a specific mass estimate of 0.03 kg/KW, the total mass of the 3,500 MW nuclear-electric power plant 12, including all of the radiator panels 78, is 105,000 kg (231,486 lbs).

The vehicle's flight attitude is maintained such that its longitudinal central axis is kept parallel to the vehicle's instantaneous velocity vector while traversing through the atmosphere.. Since the diffuser inlet diameter is greater than that of the vehicle's main body (which is assumed to be cylindrical), the lateral outer walls of the vehicle will remain separated and shielded from the moving atmosphere. Consequently it is possible to mount additional high temperature space radiators over the entire main body vehicle. In the preferred embodiment, the inlet diameter of the diffuser is 22 m (72.2 ft); the diffuser length is 48 m (157.5 ft); the diameter of the vehicle's main body is 14 m (45.9 ft); and the vehicle's overall length is 250 m (820.2 ft). The vehicle's dry mass is 600,000 kg(1,322,775 lbs) or (661.4 tons).

The vehicle's accelerating propulsion system comprises one giant 12 m diameter superconducting electron cyclotron resonance accelerator 88 mounted at the end of the vehicle 10. The basic design of this accelerator is patterned after that described in my paper "Solar Powered, Self-Refueling, Microwave Propelled Interorbital Transportation System," AIAA 18th Thermophysics Conference, June 1–3, 1983, Montreal, Canada, AIAA Paper No. 83-1446. A schematic longitudinal cross-section of the accelerator 88 is given in FIG. 6.

A 13 m diameter phased array microwave transmitter 90, comprising several hundred individual high power microwave generators 92, converts 3,500 MW of DC input power (obtained from the nuclear-electric power plant 12 via electric cables 93) into a coherent 12 m diameter, microwave beam 94. This microwave beam 94 is passed through a low loss wave guide 96 and fed into a microwave cavity 98. Assuming that the operating efficiency of each microwave generator 92 is 95% and the total DC electric input power is 3,500 MW, the microwave power fed into the microwave cavity 98 is 3,325 MW. (Microwave generators operating with a DC-to-RF conversion efficiency of 95% are possible with high power Amplitron microwave generators using high field, high energy-product permanent magnets. See "High Power Microwave Generators of the Crossed-Field Type," *Journal of Microwave Power*, Vol. 5, No. 4, Dec. 1970, pp. 245–259 by W. C. Brown.) Consequently, only about 175 MW is converted into waste heat which is absorbed by a cooling system 102 and carried via thermal conduits 104 to a low temperature space radiator system 106 where it is radiated into space.

Taking the inside diameter of the microwave cavity 98 to be 12 m (39.4 ft) the corresponding power density will be 2.94 KW/cm$^2$. This power density is well within the operating limits of high power microwave systems operating in vacuum conditions. The beam quality in terms of coherence and mode purity can be assumed to be extremely high. This will significantly improve the operating efficiency of the accelerator.

The microwave cavity 98 is constructed with relatively thin dielectric walls 108 that extend longitudinally for 16 m. The cavity 98 is completely immersed within the microwave beam 94. A 12 m diameter, $\mu/2$ thick dielectric window 110, constructed of beryllium oxide, extends transversely across the cavity near the end for preventing any of the gaseous working fluid injected into the cavity from escaping through the forward end.

A 16 m long, 14 m diameter superconducting variable field solenoid 112 is mounted around the outside walls 108 of the cavity 98 and co-axial with it. The applied magnetic field strength B of the solenoid 112 is adjusted to produce cyclotron resonance with the transverse electric field vector of the microwave beam 94 that is oscillating at frequency f. The required resonant field $B_r$ is given by $$B_r = 2\pi f(m/e) \quad (7)$$

where m/e denotes the mass to charge ratio of the elctron (5.6844×10$^{-12}$ kg/coloumb). Consequently, if f=10$^{10}$ H$_z$ (i.e. 10 GH$_z$), $B_r$=0.3572 T (3,572 Gauss). The solenoid winding is designed to generate an optimally shaped electron cyclotron resonant field 114 close to the exit of the microwave cavity 98.

Gaseous working fluid 116 (e.g., nitrogen) is fed through a feed line 118 and introduced into the cavity 98 through a plurality of submillimeter injection ports 120 which are mounted around the circumferential periphery of the cavity 98. Due to the high power density of the microwave beam 94, most gas molecules are ionized immediately after entering the cavity. When the free electrons of the ionized gas move into a region of the cavity 98 where the magnetic field is nearly equal to the electron resonant field $B_r$, they are rapidly accelerated in circular transverse paths that are perpendicular to the applied magnetic field. The electrons are thus pumped into very high-energy resonant cyclotron orbits by the microwave beam and most of the remaining gas molecules also become ionized as they flow through this resonance region. A strong coupling between the plasma and the microwave beam is created resulting in the absorption of almost 100% of the beam energy by the plasma. But this absorption is not thermalization. Most of the energy is pumped into extremely high energy electron cyclotron orbits.

The high energy orbiting electrons become strong magnetic dipoles by virtue of their circular orbits. Their magnetic moments are essentially aligned with the applied magnetic field. As shown in FIG. 6, the magnetic field strength decreases to the right giving rise to a magentic gradient $\nabla B$. This gradient is felt by the electron dipoles as a strong magnetic repulsive force which rapidly accelerates them to the right. Although the remaining ions are not affected by the magnetic gradient, the resulting charge separation accelerates them toward the electrons. A magnetic recoil effect is then exerted on the superconducting solenoid coil 112 thereby creating a propulsive reaction force. Most of the acceleration occurs well beyond the end of the microwave cavity 98 in free space.

The acceleration physics behind electron cyclotron resonance accelerators is, in reality, a beautiful and elegant combination of the so-called electromagnetic "Mass driver" accelerators, where strong magnetic fields are utilized as the accelerating mechanism, and electrostatic ion accelerators, where strong electric fields are utilized as the accelerating mechanism. In electron cyclotron resonance accelerators, the high energy electrop dipoles are first rapidly accelerated by magnetic forces as in mass driver mechanics. However, because of their very low inertial mass, these electron dipoles generate much higher linear accelerations than could ever be achieved by mass driver accelerators. Since the ions are not affected by the magnetic gradient forces they are not accelerated with the electrons and are therefore left behind. This, in turn, results in a natural charge separation which generates very intense local electric fields. These strong electric fields, however, do affect the ions and they are rapidly accelerated as in electrostatic ion accelerators. But unlike ion accelerators, these strong electric fields can operate over much longer effective distances because the electrons keep accelerating ahead of the ions, thus sustaining the charge separation. Eventually, the orbital energies of the electrons decay to relatively low levels thus converting their kinetic energy from transverse circular motion to directed linear motion. The kinetic energy of the ions remain directed within a 13° half-angle beam spread. With this overall operating mechanism, it is possible, in principal, to convert essentially 100% of the initial microwave beam energy into directed kinetic energy of the escaping neutral plasma stream.

On the basis of actual laboratory testing using nitrogen gas as working fluid, exhaust velocities exceeding 58.8 km/sec were measured corresponding to a specific impulse of 6,000 sec. (See. "Cyclotron Resonance Thruster Design Techniques," *AIAA Journal*, Vol. 4, No. 5, May 1966, pp. 835–840, by D. B. Miller and G. W. Bethke.) But these results were not the result of extensive optimization experiments with high beam quality, collisionless acceleration, and a vacuum environment, but rather rough laboratoty experiments designed to determine the potential performance capabilities. Thus, it is reasonable to assume that with nearly perfect beam quality, high power densities, vacuum operating conditions, extremely large cavity dimensions, and a collisionless acceleration process, it will be possible to achieve specific impulses at least up to 100,000 sec with microwave to directed kinetic energy conversion efficiencies on the order of 90%. By varying the mass flow rate $\dot{m}$, it will be possible to vary the specific impulse over a wide range. The effective propulsive power can be varied by varying the electric power fed into the microwave generators 92. The enormous 12 m diameter of the accelerator enables the gas density to be very low while simultaneously allowing the total rate of mass flow moving through it to be relatively high for generating high thrust. The acceleration process is essentially collisionless so that the accelerator can operate close to its ultimate theoretical performance limits with exceedingly high efficiency.

Moreover, the accelerator can be "fine tuned" while it is operating to optimize its propulsive efficiency. This can be achieved by constructing the phased array 90 with high power variable frequency Amplitron microwave generators 92. Consequently, by simultaneously varying the frequency f of the microwave beam 94 entering the cavity 98 together with the magnetic field intensity B of the superconducting solenoid coil 112, it will be possible to move and change the shape of the resonance region $B_r$ within the cavity 98 while the accelerator is operating to give optimum performance.

Ultra high specific impulses exceeding 1,000,000 sec could be achieved with this superconducting electron cyclotron resonance accelerator by employing magnetic fields on the order of 10 T (which will be relatively easy with the superconducting solenoid drive coil 112). The microwave frequency f required to achieve electron cyclotron resonance with a 10 T magnetic field will be 280 GHz (which is also realizable).

It is obvious from the above description that this giant multigigawatt electron cyclotron resonance accelerator 88 is exceedingly simple. The primary systems are the 13 m diameter phased array microwave generator/transmitter 90, the microwave cavity 98, and the superconducting drive coil 112. Since these systems can be constructed with relatively low mass, the overall thrust-to-weight ratio should be very high. It will be much higher than any ion engine, yet it should be able to easily exceed it in terms of specific impulse. Moreover, the accelerator has no moving parts and there are no electrodes. Consequently, there can be no mechanical failure or electrical failure due to eroding electrodes. Thus, the potential reliability of this accelerator will be very high. By utilizing the phased array system 90 for generating the microwave beam, and the superconducting solenoid coil 112 for generating the magnetic field, the accelerator could be constructed to an size, power, or specific impulse desired.

The accelerator can be used for accelerating any gas that might be found in the atmospheres of the various planets or satellites. It just has to be fed into the microwave cavity 98 and it is accelerated to tremendous velocities. Some gases that have high ionization potentials can be seeded with small quantities of potassium or cesium before injecting it into the microwave cavity 98. This will increase the number of free electrons and enhance the ionization process.

The fact that the electron cyclotron resonance accelerator 88 requires microwave input power instead of DC electric current does not create any serious problems or mass penalties. For example, it is possible to construct multimegawatt CW microwave generators with an overall operating efficiency exceeding 90% with a specific mass of about 20 kg/MW. The input microwave power is fed into the accelerator cavity and propagated longitudinally in the direction of the exhaust stream. Almost 100% of the incident microwave power is converted into directed kinetic energy of the exhaust stream. There is essentially zero thermalization. Any inefficiency in the conversion of microwave energy to directed kinetic energy in the exhaust stream is automatically disposed of in the exhaust stream. No special radiator system is required. Thus, the only radiators that are required are for the microwave generators (which would be relatively small because of their high operating efficiency). For additional technical information on high power microwave generators see "Investigation of MHD Power Generation," Vol. II: Integration with Cross-Field Microwave Devices, p. 119, RADC-TDR-62-464, Contract AF30(602)- 2487 by W. C. Brown.

A transverse cross-section through the end of the ECR accelerator 88 is shown in FIG. 7. As is shown in this figure, the superconducting solenoid 112 is surrounded by an annular region 121. Liquefied helium at 1.8° K is circulated through this region 121 for providing a cryogenic environment for the solenoid 112.

The propulsive thrust T generated by the accelerator 88 can be calculated by the formula $$T = \frac{2P}{u} \quad (8)$$

where P and u denote the effective propulsive power and exhaust velocity respectively. Hence, assuming that the microwave beam is converted into propulsive thrust with an efficiency of 90%, the maximum effective propulsive power of the accelerator 88 will be $0.95 \times 0.90 \times 3,500$ MW=3,000 MW. If the exhaust velocity u=98.00 km/sec (corresponding to a specific impulse of 10,000 sec) the resulting thrust will be 61,224 N (13,764 lbs). When operating at a specific impulse of 100,000 sec, the resulting propulsive thrust will be 6,122 N (1,376 lbs). The flow rate $\dot{m}$ of propulsive working fluid passing through the accelerator 88 is given by $$\dot{m} = \frac{2P}{u^2} \quad (9)$$

Hence, for specific impulses of 10,000 sec and 100,000 sec, the mass flow rate $\dot{m}$ will be 624.74 gm/sec and 6.25 gm/sec respectively. Assuming that the working fluid is $N_2$ gas, the particle densities inside the 12 m diameter ECR accelerator corresponding to these specific impulses will be $1.2 \times 10^{12}$ and $1.2 \times 10^9$ particles/cm$^3$ respectively. These particle densities are low enough to allow an essentially collisionless acceleration process. Therefore, there will be very little thermalization, and almost all of the microwave energy will be converted into directed kinetic energy of the plasma stream. When operating with a specific impulse of 2,000 sec, the particle density increases to $1.5 \times 10^{14}$ particles/cm$^3$. Since this will be too high to avoid a collisionless acceleration process, some thermalization will occur and the overall efficiency will decline. Thermalization begins when the particle density goes above approximately $10^{13}$ particles/cm$^3$—corresponding to a specific impulse of about 5,000 sec. Hence, when operating above 5,000 sec, the efficiency will be very high. If the diameter of the ECR accelerator were reduced without changing the input microwave power, thermalization would occur over a higher range of specific impulses. In the 12 m diameter ECR design disclosed herein, there will be very little thermalization when operating with a specific impulse of 5,000 sec. Assuming an operating efficiency of 90%, the resulting propulsive thrust will be 124,449 N (27,529 lbs). In order to avoid excessive thermalization at low specific impulses, the minimum allowed specific impulse will be set at 2,000 sec.

It should be emphasized that the ECR propulsion system presented herein represents an extremely powerful nuclear powered high thrust propulsion system far exceeding the performance of anything disclosed in the prior art (such as laser rocket engines or other nuclear rocket engines). When combined with the refueling retro propulsion system disclosed herein, the resulting performance capability of a vehicle propelled by this combined system will be truly revolutionary. A vehicle equipped with this combined propulsion system will be capable of making ultra high speed journeys throughout the entire solar system lasting only a few weeks instead of several years—and it never needs refueling. In order to avoid entering the atmosphere of a planet with a velocity too high to perform a safe refueling retro propulsive maneuver, the vehicle can be gradually decelerated to a lower velocity by its ECR engine as it approaches the planet. The additional working fluid expelled by this predeceleration maneuver will be more than compensated by the amount of new working fluid ingested during the refueling retro maneuver inside the planet's atmosphere.

FIG. 8 is a transverse cross-section through the vehicle shown in FIG. 1 illustrating a system of large, double sided, swing-out low temerature space radiators 106 designed for radiating away the waste heat generated by the microwave generators 92. These swing-out radiators 106 are also extended and retracted via longitudinal hinges 122. When the swing-out radiators 106 are opened up, they uncover a secondary system of single-sided low temperature space radiators 124 mounted along the external walls of the vehicle as shown in FIG. 8. The radiators are 30 m (98.4 ft) long and the combined effective radiating surface area of these two systems 106,124 is 9,200 m$^2$ (99,400 ft$^2$). The total effective radiating surface area of the high temperature nuclear-electric fold-out panel radiators 78 is 9,600 m$^2$ (103,333 ft$^2$).

The vehicle's complete accelerating propulsion system comprises: the nuclear-electric power plant(and its fold-out radiator system); the ECR accelerator(and its swing-out radiator system); and the cryogenic storage system for storing the liquefied propulsive working fluid.

The above descripiton concerns the preferred embodiment of a self-refueling propulsion system designed for a space-based reusable space vehicle. The system comprises a decelerating retro propulsion system, based on generating propulsive thrust by ingesting atmospheric gas at orbital velocity, and an accelerating forward propulsion system, based on generating propulsive thrust by expelling atmospheric gas above orbital velocity. Besides having these two basic propulsion systems, the vehicle 10 (FIG. 1) is also equipped with two large payload bays 128,130. The forward payload bay 128 is located inside the central region of the annular diffuser 14 just behind the nose cone 132. It has the shape of a large truncated cone with thermally insulated walls 134. The small diameter is 3 m (9.84 ft) and the large diameter is 14 m (45.93 ft). It has a length of 66 m (216.67 ft). The main payload bay 130 is cylindrical with an inside diameter of 14 m (45.93 ft) and a length of 40 m (131.23 ft). In case a payload is too large to be carried inside the payload bays, it is maneuvered to the front of the vehicle and secured to the inlet nozzle by small removable clamps. These situations might occur for large pre-assembled structures that require transfer from LEO to GEO. Of course, if any refueling retro maneuvers are required, all payloads must be carried inside the vehicle.

The crew quarters 136 and flight control instrumentation 138 are located directly behind the forward payload bay 128. Pressure doors 140 are provided to allow the crew to move around freely throughout most of the vehicle. Most of the interior of the vehicle is pressurized as in airliners to allow the crew members to move around without space suits.

The vehicle is also equipped with 36 small auxiliary $LO_2/LH_2$ chemical rocket engines 142 mounted in retractable pods around the end of the bay 130 (FIG. 1) for providing emergency back-up propulsion in case of a major failure in the nuclear-electric power plant 12 or in the ECR engine 88. A supply of $LO_2$ and $LH_2$ for use in these auxiliary chemical rocket engines is kept inside cryogenic storage tanks 144.

The ECR accelerator bay 145 is left unpressurized in a vacuum environment. This bay 145 contains the ECR accelerator 88, the phased array microwave generator/transmitter 90, power conditioning systems 146, Dewar systems 147, engine control and supporting systems 148, and the cooling system 102 for the microwave generators 92 mounted on the phased array 90. The primary working fluid for the ECR accelerator 88 is $N_2$ which is stored in a large 10 m long, 13 m diameter cryogenic tank 149 which is also located in the ECR bay 145. The capacity of this tank 149 is 1,000,000 kg. Other cryogenic storage tank 151 are located near the liquefyer 66 for storing other liquefied gases obtained from the atmospheres of various celestial bodies. The main cryogenic storage tank 149 mounted inside the ECR bay 145 is toroidal with a small access tunnel 153 passing through its center. This access tunnel 153 is connected to an air-lock 155 mounted on a large bulkhead 157 leading to the nuclear-electric power plant 12. This air-lock 155 and tunnel 153 system allows crew members, dressed in pressure suits, to service any of the systems inside the ECR bar 145 if they malfunction.

Table 1 describes the basic design parameters for a proposed manned, resusable, space-based, self-refueling space vehicle for future space transportation corresponding to FIG. 1.

TABLE 1

Design Parameters For A Proposed Self-Refueling Manned Reusable Space Vehicle

| Vehicle Dimensions | |
|---|---|
| Diffuser inlet diameter | 22 m |
| Diffuser length | 48 m |
| Cross-sectional inlet area | 380 m$^2$ |
| Overall vehicle length | 250 m |
| Vehicle diameter (main body) | 14 m |
| Mass Parameters | |
| Vehicle dry mass | 600,000 kg |
| LN$_2$ (maximum) | 1,000,000 kg |
| LO$_2$ (maximum) | 170,000 kg |
| LH$_2$ (maximum) | 20,000 kg |
| Nuclear-Electric Power Generating System | |
| High temperature closed cycle gas core MHD generator | |
| Thermodynamic cycle | Rankine |
| Net Power output (maximum) | 3,500 MW |
| Total system mass | 105,000 kg |

TABLE 1-continued
Design Parameters For A Proposed
Self-Refueling Manned Reusable Space Vehicle

| | |
|---|---|
| Specific mass | 0.03 kg/KW |
| Accelerating Propulsion System | |
| Superconducting electron cyclotron resonance accelerator | |
| Working fluid (normal) | $N_2$ |
| Specific impulse (variable) | 2,000 sec–100,000 sec |
| Propulsive power (variable) | 0–3,000 MW |
| Thrust (variable) | 0–306,122 N |
| Operating efficiency (overall) | 86% |
| Total $\Delta V$ (100,000 kg payload) | 970 km/sec |
| Retro Propulsion (self-refueling) | |
| Maximum retro power (surge) | 40,000 MW |
| Maximum retro thrust | $8 \times 10^6$ N |
| Maximum vehicle deceleration | 2.0 g |
| Auxiliary Chemical Propulsion System | |
| Specific impulse ($LO_2/LH_2$) | 480 sec |
| Thrust per engine | 10,000 N |
| Number of engines | 36 |
| Total thrust | 360,000 N |
| Total $\Delta V$ (no payload) | 2.0 km/sec |

Since the mass and dimensions of the proposed self-refueling vehicle are very large, it must be constructed in low Earth orbit. This could be accomplished by transporting a number of relatively small prefabricated modular sub-sections to LEO and assembling them into larger sections. The sections could then be assembled into the complete vehicle. It would require about 25 flights to assemble the vehicle if the sub-sections were transported up to LEO by the reusable ground-to-orbit space shuttle. Although this would be a very costly undertaking, the long-term benefits would be enormous. After becoming operational, the vehicle could deliver massive payloads to GEO (or to any planet in the solar system) on round-trip missions almost free-of-charge because it would never have to be refueled. Once the nuclear-electric power plant is charged with a few hundred kilograms of enriched nuclear material, the vehicle would be able to provide extremely low-cost space transportation almost indefinitely because the nuclear reactor is operated only when the vehicle is performing accelerating propulsive maneuvers.

FIG. 9 describes a typical round-trip transfer trajectory for a proposed self-refueling vehicle transporting a high mass payload (exceeding $10^6$ kg) from LEO 150 to GEO 152 and returning to LEO 150. The vehicle is accelerated out of LEO 150 using its high thrust ECR engine drawing maximum propulsive power from its on-board 3,500 MW nuclear-electric power plant. The propulsive maneuver from LEO 150 to GEO 152 is continuous and lasts for several days. It is shown in FIG. 9 by the spiraling propulsive trajectory 154. As the vehicle approaches GEO 152, its orbit becomes circular and the inclination is reduced to zero. After rendezvousing with an orbiting space station 156 and delivering the payload, the vehicle is returned to LEO 150 by an initial retro and plane change maneuver 158. Since it is assumed that the payload mass exceeds the total initial vehicle mass, the flight time from GEO back to LEO will be much shorter than that from LEO to GEO. Since there is no atmosphere at GEO, the initial retro maneuver 158 has to be performed by the vehicle's ECR engine 88 in the usual way by expelling the gas in the direction of motion. As is shown in FIG. 9, this maneuver 158 is designed to lower the perigee 160 of the vehicle's return trajectory 162 so that it dips inside the upper reaches of the Earth's atmosphere 164. This allows all subsequent retro maneuvers to be performed by scooping up and ingesting portions of the Earth's atmosphere 164—thereby automatically refueling the vehicle for the next mission. The atmospheric entry trajectory 166 is designed to give a sufficiently high perigee altitude so as to avoid generating excessive deceleration loads that may tend to overstress the vehicle's structure. Thus, the refueling retro propulsion maneuvers 168 on the way back to LEO comprise a series of several atmospheric re-entry trajectories designed to lower the vehicle's apogee 170 until it reaches LEO 150. When the apogee 170 reaches LEO altitude, a positive propulsive maneuver is executed (with the ECR engine 88) while the vehicle passes through its apogee 170 that lifts the perigee 160 out of the Earth's atmosphere 164 and circularizes the orbit in LEO 150. This final propulsive maneuver is very small and requires a $\Delta V$ of only about 30 m/sec.

Since the maximum velocity of the air entering the vehicle's diffuser nozzle during the refueling retro maneuver is about 10.3 km/sec (corresponding to a negative specific impulse of 1,050 sec) it is significantly lower than the exhaust velocity of the ECR engine 88. Thus, there will always be more air scooped up and ingested by the vehicle during refueling retro maneuvers than used by the ECR engine 88 even though the initial retro maneuver 158 back to LEO 150 is performed by the ECR engine 88. This excess allows the ECR engine 88 to operate with only the $N_2$ component of the scooped up air instead of the $O_2/N_2$ mixture. The $O_2$ component is separated out during the liquefaction process and used for propelling other vehicles using chemical rocket engines. By adjusting the ECR engine's specific impulse according to the payload mass of each mission (i.e., according to the vehicle's thrust-to-weight ratio), the air-in to nitrogen-out mass flow ratio for each round-trip mission to GEO can be designed to give equal nitrogen-in to nitrogen-out mass flow ratios. Consequently, the vehicle is completely self-refueling and carries only enough working fluid (i.e., nitrogen working fluid) to carry out each specific mission.

The revolutionary economic advantages and implications of this self-refueling operating principle can be best understood by some detailed quantitative analysis. For example, in the round-trip mission to GEO described above and illustrated in FIG. 9, suppose that after depositing the payload in GEO, the total vehicle mass is 640,000 kg. The required initial $\Delta V$ retro maneuver at GEO which will drop the perigee 160 of the vehicle's return trajectory 162 inside the Earth's atmosphere 164 (for the refueling retro maneuver) while simultaneously changing the inclination of the return trajectory from 0° to 28.6° (LEO inclination) will be 1.84 km/sec. This initial retro maneuver will be carried out by the ECR engine 88 operating with a specific impulse of 5,000 sec. The corresponding exhaust velocity u will be 49.00 km/sec. The total amount of $N_2$ propulsive working fluid consumed during this initial retro maneuver can be calculated by the mass ratio equation of classical rocket propulsion given by equation (2) by setting $\Delta V = 1.84$ km/sec $u = 49.00$ km/sec and $M_1 = 640,000$ kg. Hence, $M_2 = 616,413$ kg and the amount of $N_2$ working fluid used in this maneuver will be $m_p = M_1 - M_2 = 23,587$ kg. Since the propellent flow rate $\dot{m}$ corresponding to a specific impulse of 5,000 sec will be 2.50 kg/sec (which can be calculated from equation (9)), this initial retro propulsive maneuver at GEO will require 9,439 seconds (2.62 hours) to complete.

The circular orbital velocity of a 200 km high LEO is 7.784 km/sec. For simplicity, it can be assumed that the refueling retro maneuver is carried out by only one dip into the Earth's atmosphere. Consequently, assuming that the atmospheric refueling maneuver begins and ends at an altitude of 100 km, the vehicle's entry and exit velocities $V_1$, $V_2$ into and out of the Earth's atmosphere will be 10.239 km/sec and 7.894 km/sec respectively. (The perigee altitude will be about 50 km.) Hence, the retro velocity change $\Delta V = V_1 - V_2 = 2.365$ km/sec. The amount of atmospheric working fluid ingested during this refueling retro maneuver can be calculated from the mass ratio equation of refueling retro propulsion given by equation (4). Hence, since $M_1 = 616,413$ kg, it follows that $M_2 = 616,413 \times (10.239/7.874) = 801,556$ kg and the amount of atmospheric air ingested during the retro maneuver will be $M_2 - M_1 = 185,143$ kg. Assuming that this ingested air comprises 23% $O_2$ and 77% $N_2$, it follows that this refueling retro maneuver generates 142,560 km of new $N_2$ working fluid to propel the vehicle on the next mission to GEO, and 42,583 kg of $O_2$. After the vehicle leaves the atmosphere, it moves 170° around the Earth and passes through its apogee (at an altitude of 200 km) where its velocity drops to 7.754 km/sec. A small accelerating propulsive maneuver is carried out at this point with $\Delta V = 7.784 - 7.754 = 0.030$ km/sec which lifts the perigee out of the atmosphere and circularizes the orbit in LEO. The amount of $N_2$ used for this accelerating propulsive maneuver is only 491 kg (when operating the ECR engine with a specific impulse of 5,000 sec). It is evident that in this theory of self-refueling rocket propulsion, the amount of propulsive working fluid ingested during retro maneuvers increases with vehicle mass. Thus, in this respect, a high vehicle mass will actually be desirable.

When the vehicle returns to LEO, it is automatically refueled (by the retro maneuver) and ready to go on the next mission. In order to further illustrate the profound economic benefits that the self-refueling propulsion system represents, suppose that all of the $N_2$ and $O_2$ obtained from the retro maneuver has to be transported up from the Earth's surface. Since the cost of delivering bulk cargo to LEO by the reusable ground-to-orbit space shuttle is about $2,200/kg, the total cost would be $407,314,600—and it would require seven separate flights. But all of this savings comes from only one return flight from GEO. When many flights are contemplated, the potential economic benefits become almost unimaginable.

Keeping in mind the tremendous savings in fuel cost, it is interesting to calculate how much new payload can be transported back to GEO with the 142,560 kg of new $N_2$ propulsive working fluid obtained free-of-charge from the refueling retro maneuver of the previous mission. Thus, after returning to LEO, the vehicle rendezvous with an orbiting space station, exchanges the 42,583 kg of $O_2$ for another payload, and departs on another mission to GEO. The ECR engine will be operated with a specific impulse of 10,000 sec on the way back to GEO. Assuming that the spiraling propulsive trajectory from LEO to GEO requires a total $\Delta V$ of 5.20 km/sec, the resulting mass ratio will be 1.0545. Consequently, since $M_1 = 142,560 + 16,413 + 600,000$ (vehicle dry mass) $+ M_p$ and $M_2 = 640,000 + M_p$, (where $M_p$ denotes the payload mass) it follows from equation (2) that $M_p = 1,534,213$ kg. The total flight time will be about four days. Although it would require 51 ground-to-orbit shuttle flight to transport this amount of payload mass from the Earth's surface, no propulsive fuel would have to be delivered. But if this payload mass had to be delivered to GEO by conventional prior art chemical OTV's, the required fuel load that would have to be transported up from the Earth's surface would be 10,358,910 kg. Hence, the total mass that would have to be transported up would be 11,893,123 kg and it would require 397 separate shuttle flights. The total cost would amount to $2.6 \times 10^{10}$. This would exceed the total cost of the entire Apollo lunar landing project. These calculations clearly demonstrate the enormous performance capability of the self-refueling vehicle and the revolutionary economic benefits that can be derived from it.

Since the nuclear reactor 80 only has to be operated for about 4 days to carry out the mission, the amount of enriched nuclear fuel expended will be extremely small (e.g., less than one kilogram). In fact, the reactor will only have to be recharged about once every three years. (Extra amounts of enriched nuclear fuel could be carried in reserve on-board the vehicle when going on deep-space interplanetary missions.) Since the cost of very small amounts of enriched nuclear fuel consumed during the various missions will be very low, the total cost of transporting payloads anywhere in the solar syste, will be very low.

Aside from the fact that no propulsive working fluid has to be transported up from the Earth's surface to refuel the vehicle after each mission, there is another important benefit that should be emphasized. Since the self-refueling vehicle is operated with equal nitrogen in to nitrogen-out mass flow ratios, large amounts of excess oxygen will be manufactured aboard the vehicle because approximately 23% of the ingested air will be oxygen which is not used by the ECR engine 88. This excess oxygen could be removed from the vehicle and made available to various orbiting space stations at essentially zero cost. It could also be used aboard relatively small $LO_2/LH_2$ chemically propelled rocket vehicles using hydrogen brought up from the Earth's surface. These chemically propelled vehicles could be reusable lunar or planetary landing vehicles. They could be left in orbit around the Moon or around other planets (or satellites thereof). They could also be carried inside one of the payload bays of a self-refueling vehicle. Since the $LO_2$ to $LH_2$ mass ratio for $LO_2/LH_2$ chemical rockets is 8 to 1, the process of having to bring up only the hydrogen component reduces the total mass that would ordinarly have to be transported up from the Earth's surface to refuel chemically propelled $LO_2/LH_2$ vehicles by a factor of 9. Thus, by bringing up relatively small amounts of $LH_2$ inside the ground-to-orbit reusable space shuttle, actual manned lunar or planetary landing and exploration missions would be possible by using a self-refueling vehicle as the basic interorbital or interplanetary transfer vehicle and as a source for manufacturing all of the $LO_2$ required for the landing vehicle. This is an important consideration when contemplating the true economic implications of self-refueling space vehicles.

As pointed out above, in order to take advantage of the excess oxygen that is generated as a by-product aboard the proposed self-refueling vehicle, the vehicle is also equipped with a small auxiliary $LO_2/LH_2$ chemical propulsion system 142 (FIG. 1).

The self-refueling vehicle shown in FIG. 1 with the design parameters given in Table 1, is also capable of transporting high mass payloads between the various planets on direct-flight hyperbolic interplanetary trajectories with very short flight times. Every planet in the solar system (with the possible exception of Pluto) has an atmosphere that can be used for carrying out high speed refueling retro maneuvers. The gas collected from one planet's atmosphere during the retro capture maneuver will provide the propulsive working fluid to propel it away from the planet and enable it to travel to another planet. Thus, a single self-refueling reconnaissance vehicle could carry out a whole series of interplanetary flights from one planet to another planet that includes going into actual parking orbits at each planet. By carrying only a few thousand kilograms of enriched nuclear fuel for operating its on-board power generating system, one self-refueling space vehicle could travel around the entire solar system, exploring the planets from planet to planet for several years without ever having to return to Earth for refueling.

FIG. 10 describes the trajectory of a self-refueling space vehicle on a high speed mission to Io 172 (the second satellite of Jupiter) with a payload of 200,000 kg. The total flight time from Earth to Jupiter 174 is about 5 months. The vehicle approaches Jupiter 174 on a hyperbolic preencounter trajectory 176 which is designed to dip into the planet's upper atmosphere 178 for a decelerating retro propulsive maneuver 180 which places it onto a low energy elliptical transfer trajectory 182 that intercepts Io 172. The high speed retro maneuver 180 inside Jupiter's atmoshere 178 enables the vehicle to be automatically refueled for a high-speed return trip back to Earth (or to some other planet) after exploring Io.

After the refueling retro propulsive maneuver 180 inside Jupiter's atmosphere 178, the vehicle circularizes its post encounter trajectory 182 (using its ECR engine 88) to match the orbit of Io 183 and falls into a preselected low altitude parking orbit 184 around Io. The 200,000 kg payload could be a small reusable $LO_2/LH_2$ chemically propelled excursion module for making a manned landing on the surface of Io. After the surface exploration of Io is completed, the crew returns to the self-refueling mother ship inside the chemically propelled excursion module. After rendezvousing and docking with the mother ship, the excursion module is left in the parking orbit 184 and the crew returns to Earth inside the self-refueling mother ship. The reusable, space-based excursion module can then be used for future manned landing missions to Io. By repeating this exploration mission to other planets (and satellites thereof) a reusable chemically propelled landing excursion module could eventually be placed in orbit around every celestial body in the solar system suitable for future manned landing missions. A vast surface-to-orbit reusable transportation system could be established by this technique at all such celestial bodies throughout the entire solar system. After this system is established, the self-refueling planetary transfer vehicles (PTVs) would not have to carry any more landing excursion modules. They would only carry the $LO_2/LH_2$ propellents required to refuel them (which would not be very much because the required $\Delta V$'s would be small). It might be possible to eventually manufacture the required propellents in specially constructed plants on the surfaces of the celestial bodies by extracting it from surface rocks (or sub-surface mining). This would be possible for a lunar landing transportation system. If it is possible to manufacture $O_2$ on the satellites of Jupiter, then the interplanetary self-refueling vehicles going to those satellites will not have to carry any $H_2$ fuel for the orbiting landing vehicles because it can be obtained free of charge during the refueling retro maneuver at Jupiter. Jupiter's atmosphere contains a very high percentage of $H_2$.

Table 2 describes the general performance capabilities of the proposed self-refueling space vehicle corresponding to the design parameters given in Table 1.

TABLE 2

Performance Capabilities Of A Proposed Self-Refueling Space Vehicle Drawing Power From An On-Board Nuclear-Electric Power Plant

| Mission | Flight Time | Payload |
| --- | --- | --- |
| LEO to GEO | 20 days | $5.0 \times 10^6$ kg |
| LEO to GEO | 5 days | $1.5 \times 10^6$ kg |
| Earth - Mars | 35 days | $2.0 \times 10^5$ kg |
| Earth - Io | 150 days | $2.0 \times 10^5$ kg |

The above performance figures clearly indicate the tremendous economic advantages that self-refueling vehicles offer for future space travel. The self-refueling propulsion system represents a revolutionary propulsion breakthrough that will open the door to the economic colonization of the entire solar system.

Although the high power on-board nuclear-electric power plant plays an important role in the preferred embodiment of the self-refueling propulsion system disclosed above, it is not an indispensable element that must be included in all self-refueling propulsion system designs. The second embodiment presented herein does not require any high-power electric generating source. In this alternative design, the retro maneuver is not only used to generate working fluid for the ECR accelerator engine, but also to simultaneously generate the electrical energy needed to operate it. Consequently, it represents a much more sophisticated vehicle design.

In the first embodiment, the directed kinetic energy of the incoming gas is converted into thermal energy and radiated away into space. In the second embodiment, this incoming kinetic energy will be converted into electrical energy and stored on-board the vehicle. Thus, in this design, the propulsion system is not only self-refueling but also self-energizing. It therefore represents a propulsion concept that involves not only the principle of conservation of momentum—which is represented by self-refueling rocket propulsion that is based upon a reverse application of the theory of classical rocket propulsion but also the conservation of energy as well. This concept leads to a theory of rocket propulsion that might be called "regenerative rocket propulsion". The second embodiment of a self-refueling propulsion system presented herein is based on this regenerative rocket propulsion concept. The propulsion system embodying this theory will be called a "regenerative rocket propulsion system".

In reference to FIG. 11, the proposed regenerative rocket propulsion system comprises a high power superconducting MHD generator 186 designed for converting the directed kinetic energy of the incoming atmospheric gas stream into electrical energy during decelerating retro propulsive maneuvers, and a large ECR accelerator 188 designed for converting that electrical energy back into directed kinetic energy of the exhaust gas during accelerating propulsive maneuvers.

It also comprises a large superconducting energy storage system 190 designed for storing the electrical energy generated by the MHD generator 186 during regenerative retro propulsive maneuvers. The vehicle 192 and the MHD generator 186 and ECR engine 88 are designed to enable the conversion of directed kinetic energy of the gas stream into electrical energy, and vice-versa, to proceed with minimal thermalization so as to maximize the overall energy conversion efficiencies.

In order to collect the hypervelocity atmospheric gas and feed it into the MHD generator 186 during regenerative propulsive retro maneuvers with minimum thermalization, an extremely long, smooth-walled conical gas inlet nozzle 194 is used. As is shown in FIG. 11, a large portion of the space vehicle 192 is built around the hypervelocity inlet nozzle 194 which extends along the vehicle's longitudinal central axis. The apex angle of the nozzle is very nearly equal to twice the Mach angle such that the initial shock waves move nearly parallel to the inside nozzle walls 196. Thus, as the gas stream moves through the inlet nozzle 194, it loses very little of its initial longitudinal velocity.

In order to minimize skin friction due to turbulence in the boundary layer adjacent the inside walls of the nozzle, an elongated, narrow, toroidal susperconducting magnetic shock wave deflector coil 198 is mounted adjacent the outside walls 200 of the nozzle 194 (FIG. 11). The windings of this coil 198 extend longitudinally, parallel to the outside nozzle walls 200, and extend back and forth completely around the nozzle 194 enclosing it within a relatively thin double walled magnetic jacket. This coil 198 generates a transverse clockwise magnetic field $\vec{B}$ adjacent the nozzle surface inside the boundary layer 202. Since a high percentage of the gas inside the boundary layer 202 adjacent the nozzle surface is ionized, it experiences a strong Lorentz force $q+(\vec{u}\times\vec{B})$ that forces it to move inward toward the longitudinal central axis of the nozzle 194. Thus, the boundary layer 202 actually moves adjacent the nozzle surface 196 but is kept separated from it by a magnetic cushion. This allows the incoming atmospheric gas to pass through the entire nozzle 194 without losing any significant longitudinal velocity. It also results in a nearly isentropic magnetic compression of the gas as it moves through the nozzle 194 because of the converging walls.

The end 204 of the intake nozzle 194 is joined to the beginning of the deceleration duct 206 of the superconducting MHD generator 186. The nozzle geometry is designed such that the traveling shock waves converge just before the gas enters the MHD duct 206. These converging shock waves automatically ionize virtually all of the atmospheric gas entering the MHD duct 206. The resulting effective electrical conductivity of the incoming hypervelocity gas will be on the order of 400 mho/m. This is about four times greater than typical high efficiency MHD electric generators. The conducting hypervelocity gas enters the MHD duct 206 with a velocity close to the vehicle's orbital velocity and is decelerated by very strong $\vec{J}\times\vec{B}$ forces while it travels through the duct 206.

The MHD duct 206 is 50 m (164 ft) long and the transverse magnetic field is generated by a large superconducting coil 208. The field strength can be varied from 2.0 T to 20.0 T in order to maximize the operating efficiency of the MHD generator 186 and to enable the generator 186 to operate with very high electrical efficiency with a multitude of different gases and inlet velocities. Almost all of the directed kinetic energy of the moving gas stream is extracted and converted into electrical energy. The conducting gas stream is decelerated longitudinally via strong $\vec{J}\times\vec{B}$ forces while passing through the duct 206 and these forces generate strong magnetic recoil forces all along the superconducting coil 208. Since the superconducting coil 208 is bolted to the space vehicle's internal structure, these strong magnetic forces acting on the MHD coil 208 are transmitted to the vehicle and generates the basic decelerating retro propulsion. The gas emerges at the end of the MHD duct 206 with very little stream velocity. The MHD generator 186 serves as the vehicle's regenerative decelerating engine for providing decelerating retro propulsion just as the ECR accelerator 188 serves as the vehicle's accelerating engine for providing forward accelerating propulsion. However, unlike the forward propulsion ECR accelerator engine 188, the decelerating retro propulsion MHD generator engine 186 is much larger and is designed to operate with relatively short surge powers on the order of tens of gigawatts. The retro thrust generated by this engine 186 can be extreme high—many times higher than the thrust of the ECR accelerator engine 188 operating at full power.

The kinetic-to-electric conversion efficiency of the MHD generator engine 186 can be designed to be very high and may approach 90%. Essentially all of the electrical systems associated with the generator 186 are superconducting in order to be able to handle peak surge powers exceeding 20 GW, and to be able to feed this power into the superconducting energy storage system 190. A relatively large power conditioning system 210 is mounted inside the MHD generator bay 212 and serves as the power interface between the MHD generator 186 and the superconducting energy storage system 190.

A detailed technical disclosure of the design of the MHD generator 86 is omitted as it is considered to be within the prior art. The design of the ECR accelerator engine 188 is essentially identical to that described above for use in the preferred embodiment.

After passing through the retro MHD generator engine 186, the gas is fed into a high temperature space radiator 214 mounted around a portion of the vehicle's outer surface, where it is cooled. This radiator is essentially identical to the high temperature radiator 54 described in the preferred embodiment. After the gas is withdrawn from the first radiator 214 it is fed into a pre-liquefaction system 216 comprising a plurality of serially connected turbocompressors 218 and space radiators 220. This preliquefaction system 216 lowers the entropy of the gas and is essentially identical to the turbocompressors 58 and space radiators 60 described in the preferred embodiment. After the gas passes through the pre-liquefaction system 216, it is fed into a liquefaction system 222 where it is cooled to cryogenic temperatures and liquefied. The liquefaction system 222 also includes a separation system 224 where all of the components of the ingested atmospheric gas are separated into their respective parts and stored cryogenically in various storage tanks 226.

The electric power generated during the regenerative retro maneuvers by the MHD generator engine 186 is fed into two very large self-shielding elongated toroidal superconducting coils 228,230 and stored inductively in the form of intense magnetic fields. These coils are designed to be extremely large in order to take advantage of the very favorable E/M scaling laws for inductive superconducting energy storage systems. The first coil 228 is mounted around the gas inlet nozzle 194 and occupies a large portion of the vehicle's volume surrounding the nozzle 194. The second coil 230 is mounted within the central portion of the vehicle 192. A relatively small diameter, connecting tunnel 232 passes through the longitudinal central axis of the main elongated toroidal superconducting coil 230 and provides a passageway between the rear and forward portions of the vehicle 192. FIG. 12 is a transverse crosssection through FIG. 11 further illustrating the design and construction of the coil 230 and the connecting tunnel 232 passing through it.

The inductive energy storage coils 228,230 are analogous to the large cryogenic storage tanks of large chemical rockets. However, in this case, the space inside the superconducting coils is filled with magnetic fields that have zero inertial mass. Since the volume energy density of a magnetic field of strength B(Teslas) is equal to $B^2/2\mu_o$ where $\mu_o = 4\pi 10^{-7}$, the total energy storage capacity of the coils can be significantly increased by employing high strength magnetic fields. By employing ultra high strength carbon fiber reinforcement techniques to contain magnetic pressure, it should be possible to construct large space-borne superconducting toroidal energy storage coils with field strengths on the order of 25 T. The construction details involving carbon fiber reinforced superconducting cables can be found in my U.S. Pat. No. 4,078,747 entitled "Orbiting Solar Power Station" filed June 2, 1975.

All of the energy stored in the superconducting storage system is used to power the ECR accelerator engine 188 during accelerating propulsive maneuvers. Since large inductive energy storage systems can be charged and discharged at extremely high power levels, it is possible to operate the ECR accelerator engine 188 with very high input power. Operating the ECR accelerator engine 188 at high power levels will also tend to increase its operating efficiency. The overall electric-to-directed kinetic energy operating efficiency can be designed to approach 90% by using nitrogen as the propulsive working fluid. Since the ionization potential of nitrogen is relatively low, the energy lost due to ionizing the gas will be low.

Since the in-out electric power transfer efficiency of the superconducting energy storage system will be essentially 100%, the overall operating energy transfer efficiency between regenerative retro prooperating pulsive maneuvers and accelerating propulsive maneuvers (i.e., the overall energy conversion efficiency between the directed kinetic energy of the incoming decelerated gas and the outgoing accelerated gas) will be very high—perhaps approaching 90%. This high overall operating efficiency will reduce the amount of waste heat that will have to be radiated away by the radiators. Hence, the size of waste heat radiators will be small relative to the operating powers.

The high temperature space radiator system 234 used for the MHD generator engine 186 is mounted around the vehicle's external surface surrounding the MHD generator bay 212 (FIG. 11). The high temperature space radiator systems 214,220 used to cool the gas are mounted behind the generator system 186 and are similar to the radiators 54 and 60 described in the preferred embodiment. The low temperature space radiator system 236 used by the ECR accelerator engine 188 is essentially identical to the swing-out system 106 described above in the preferred embodiment.

As is shown in FIG. 11, the cryogenic storage tanks 238 are mounted between the payload bay 240 and the ECR accelerating engine 188. The vehicle 192 is also equipped with 36 auxiliary $LO_2/LH_2$ chemical rocket engines 242 for emergency back-up propulsion. These engines 242 are essentially identical to the auxiliary chemical rocket engines 142 described in the preferred embodiment. The power conditioning system and related control systems 244 associated with the ECR accelerating engine 188 are mounted adjacent this engine. The crew quarters and flight control center 246 is located between the MHD generator engine 186 and the gas liquefaction system 222.

The dimensions of this self-refueling vehicle design are much greater than those of the preferred embodiment. In this design, the overall length of the vehicle 192 is 550 m (1.804 ft) and the diameter is 60 m (197 ft). More than half of the vehicle's total volume is occupied with superconducting energy storage coils. This is the reason why the vehicle is so long. The preferred embodiment is much shorter because it has no such inductive energy storage coils.

If this self-refueling vehicle 192 is designed to operate primarily as an Earth orbital transfer vehicle (OTV), the energy lost by conversion inefficiencies can be made up by docking with an orbiting electric generating plant in LEO and recharging its on-board superconducting energy storage coils prior to the next round-trip orbital transfer mission. Relatively small superconducting electric cables could be used such that the power transfer could take place with power levels on the order of several gigawatts. The entire energy storage system could be completely recharged in a few hours. This recharging process would be analogous to refueling a conventional chemically propelled vehicle at an orbiting refueling station. However, in this case, the propulsive energy does not come from chemical fuels that have to be transported up from the Earth's surface at great expense. It is, rather, electrical energy which has no inertial mass and is generated in Earth orbit.

If the time interval between successive orbital missions is on the order of 30 days or more, the electrical energy lost by conversion inefficiencies could be made up by a relatively small, low power on-board nuclear-electric generating system. Unlike the high power nuclear-electric generating system 12 described in the preferred embodiment which only operates during accelerating propulsive maneuvers, this low power system would be designed to operate continuously on a non-stop basis feeding electrical energy into the superconducting energy storage system where it is accumulated over long time periods. Such a system would enable the vehicle to be completely self-sufficient. The vehicle could also be able to carry out high speed interplanetary missions throughout the entire solar system (in addition to Earth orbital missions) as described in the preferred embodiment.

Table 3 describes the basic design parameters for the alternative embodiment of a self-refueling space vehicle using a regenerative propulsion system corresponding to FIG. 11.

TABLE 3

Design Parameters For A Proposed
Self-Refueling Manned Reusable Space Vehicle
Using A Regenerative Propulsion System

| Vehicle Dimensions | |
|---|---|
| Gas inlet nozzle diameter | 60 m |

TABLE 3-continued
Design Parameters For A Proposed
Self-Refueling Manned Reusable Space Vehicle
Using A Regenerative Propulsion System

| | |
|---|---|
| Nozzle length | 200 m |
| Cross-sectional inlet area | 2,827 m$^2$ |
| Overall vehicle length | 550 m |
| Mass Parameters | |
| Vehicle Dry Mass | $2 \times 10^6$ kg |
| LN$_2$ (maximum) | $2 \times 10^6$ kg |
| LO$_2$ (maximum) | $5 \times 10^5$ kg |
| LH$_2$ (maximum) | $6 \times 10^4$ kg |
| MHD Generator | |
| (regenerative retro propulsion) | |
| Peak operating power (surge) | 20,000 MW |
| Maximum magnetic field strength | 20 T |
| Maximum retro thrust | $4 \times 10^6$ N |
| Maximum retro acceleration | 1.5 g |
| Efficiency (kinetic-to-electric) | 90% |
| ECR Accelerator | |
| (accelerating propulsion) | |
| Working fluid (normal) | N$_2$ |
| Specific impulse (variable) | 2,000 sec–100,000 sec |
| Propulsive power (variable) | 0–3,000 MW |
| Thrust (variable) | 0–306,122 N |
| Operating efficiency (overall) | 86% |
| Total ΔV (100,000 kg payload) | 20 km/sec |
| Energy Storage System | |
| (Superconducting) | |
| Total inductor volume | $10^6$ m$^3$ |
| Average magnetic field strength | 25 T |
| Total stored energy | $2.5 \times 10^{14}$ J |
| Auxiliary Chemical | |
| Propulsion System | |
| Specific impulse (LO$_2$/LH$_2$) | 480 sec |
| Thrust (variable) | 0–15,000 N |
| Number of engines | 36 |
| Total maximum thrust | 360,000 N |
| Total ΔV (no payload) | 2 km/sec |
| Auxiliary Nuclear-Electric | |
| Power System Solid Core | |
| Thermodynamic cycle | Stirling |
| Net power output | 20 MW |
| Total system mass | 32,000 kg |
| Specific mass | 1.6 kg/KW |

Unfortunately, the interplanetary performance capabilities of this second self-refueling vehicle design are much lower than that described for the preferred embodiment because there is no high power gigawatt range electric generating plant on-board the vehicle. However, it does have a fairly high interorbital transfer capability. The lower power auxiliary on-board nuclear-electric power plant is based on state of the art multi-megawatt solid core nuclear power plant technology with closed thermodynamic cycles. This on-board power plant allows the vehicle to be completely self-sufficient without having to recharge its superconducting energy storage system from an orbiting power plant. It also enables the vehicle to be used for high speed interplanetary missions. (For detailed technical information describing state of the art nuclear-electric power generating systems for space vehicles see, "Nuclear Space Power Systems for Orbit Raising and Maneuvering," *Orbit-Raising and Maneuvering Propulsion: Research Status and Needs*, Vol. 89, Progress in Astronautics and Aeronautics, 1984, pp. 425-459, by D. Buden and J. Sullivan.)

One of the important advantages of the second embodiment is that the superconducting energy storage system can be discharged at very high power levels. This allows the ECR accelerator to operate at high power densities and therefore generate high thrust.

An important variation of this second embodiment of a self-refueling propulsion system (regenerative system) is one where the decelerating engine and the accelerating engine are designed such that they become one and the same system that can be operated as a generator or as an accelerator. In this embodiment, the regenerative self-refueling propulsion system is represented by a high power superconducting MHD system which is designed to operate either as an MHD generator for generating decelerating vehicle propulsion, or as an MHD accelerator for generating accelerating vehicle propulsion.

The unique design feature of this MHD system which allows it to operate either as a generator (for retro thrust) or as an accelerator (for accelerating thrust) is exceedingly simple and shown in the block diagram of FIG. 13. The regenerative MHD generator/accelerator propulsion system 248 in this embodiment is connected to the power conditioning system 250 and to the superconducting energy storage system 252 via electrical cables 254. A system of high power electrical switches 256 are installed between the power conditioning system 250 and the MHD system 248. These switches 256 are designed to reverse the electrical polarity of the electrodes 258 of the MHD system. These switches 256 allow the cathodes and anodes of the MHD system to be reversed. The effect of this reversal changes the operating mode of the MHD system. When the switches 256 are in position A (FIG. 13) the system operates as an MHD accelerator. When they are switched to position B, the system operates as an MHD generator. By reversing the polarity of the electrodes 258, the current density vector $\vec{J}$ reverses direction from $\vec{J}$ to $-\vec{J}$. Consequently, since the transverse magnetic field $\vec{B}$ 260 does not change direction, the body forces $\vec{F} = -\vec{J} \times \vec{B}$ acting on the gas that accelerate it inside the duct 262 when the switches are in position A, are changed to $\vec{F} = -\vec{J} \times \vec{B}$ when the switches are changed to position B. These forces act in the opposite direction thereby causing the gas flowing through the duct to decelerate. The kinetic energy of the gas stream is extracted essentially without thermalization and converted directly into electric current. Thus, the MHD system can be changed from an accelerator to a generator merely by flipping the switches 256 from position A to position B. This dual operating feature of the MHD system 248 is essentially identical to what is involved in converting an ordinary, rotating electric motor into an electric generator. For more detailed technical information on the possibility of designing a dual mode MHD generator/accelerator system see, "MHD Accelerator Performance for Specified Interaction Parameter," AIAA Journal, Vol. 4, No. 11, Nov. 1966, pp. 2078-2079, by C. H. Marston.

This embodiment is important because it completely eliminates the need to have two separate propulsion systems—one for providing decelerating retro propulsion and one for providing accelerating forward propulsion. The two separate propulsion systems 186 and 188 described in the second embodiment could be replaced by only one system 248 mounted at the end of the inlet nozzle. Except for the operating mode switches 256 this MHD decelerator/accelerator engine 248 is essentially identical to the MHD generator engine 186 described in the previous embodiment. The ECR accelerator engine 188, and all of the related power conditioning systems and radiator system 236 can be completely eliminated.

The inlet nozzle 194 would also become the vehicle's exhaust nozzle.

Although installing the operating mode switches 256 is essentially all that is necessary in order to be able to operate the MHD generator 186 as an accelerator, a system must be provided for introducing the gas into the MHD channel 262 so that it can be accelerated through it by the $\vec{J} \times \vec{B}$ forces. The system must first ionize the gas to make it a conducting plasma, and then it must inject the plasma into the MHD channel 262 with a reasonably high initial velocity. In the prior art of MHD accelerator design, this ionization and injection system is usually provided by an air jet. However, arc-jets have electrodes which inevitably erode away resulting in complete failure. The system presented herein is based upon generating a plasma by microwave absorption. The operating features and construction details of this system are shown in FIG. 14.

In the proposed ionization and injection system, the gaseous working fluid (i.e., atmospheric gas) is seeded with small quantities of potassium or cesium 264 (about 1% by weight) to increase its electrical conductivity and introduced into a dielectric microwave absorption cavity 266 containing focused microwave radiation 268. The microwaves 268 are produced by a microwave generator 270 operating between 2 MW and 200 MW. (The microwave power represents about 10% of the accelerator's effective propulsive power.) The microwaves 268 are reflected by a focusing reflector 272 into the dielectric microwave cavity 266 and converge to a relatively small region 274 near the center of the cavity 266. The focused microwave power 268 generates a flux of sufficient intensity to cause partial ionization. The RF power is then coupled to the electrons of the partially ionized gas and heats the gas to very high temperatures. This, in turn, creates greater ionization and results in nearly 100% absorption of the microwave power by the gas inside the cavity 266. Hence, the gas is transformed into a highly conductive plasma 276. The high temperature plasma 276 inside the cavity 266 is heated to very high temperatures (on the order of 10,000° K) and expelled through a pre-accelerating expansion nozzle 278. The end of the expansion nozzle 278 is connected to the inlet duct 280 of the MHD channel 262. The highly conductive neutral plasma 276 enters the MHD channel 262 with an initial velocity of about 2 km/sec and is rapidly accelerated through it by strong $\vec{J} \times \vec{B}$ forces. Although the plasma leaves the channel 262 at a very high velocity, and passes through the nozzle 194 as a narrow beam, the shock wave magnetic deflector coil 198 around the nozzle 194 prevents any of the exhaust gas from making direct contact with the inside walls of the nozzle 194. (When the MHD system 248 is operating as an accelerator, the current inside the deflector coil 198 is reversed such that a magnetic repulsion force is generated along the nozzle walls that keeps the exhaust gas moving in a narrow beam along the longitudinal central axis of the nozzle 194.)

The microwave powered, ionization and injection system is essentially a microwave powered rocket engine similar to that described in my U.S. Pat. No. 3,891,160 entitled "Microwave Powered Reusable Orbiting Space Tug," filed Mar. 32, 2973. With this system, it will be easy to ionize any atmospheric gas found on any celestial body in the solar system and accelerate it through the MHD system 248. This is an important operating feature of this system because it allows the MHD accelerator to operate with any planetary atmosphere. For detailed technical information on microwave plasma generators see: "The Design Of A Microwave Plasma Cavity," Proceedings of the IEEE, Vol. 62, No. 1, Jan. 1974, pp. 109–117, by J. Asmussen, Jr. et al.

In order to allow the MHD system 248 to operate as an electric generator, the entire microwave plasma generator and injection system must be mounted on a movable structure 282 so that the injection expansion nozzle 278 can be disconnected from the end of the MHD channel 62, moved aside, and replaced with a movable thermally insulated hot gas collection vessel 284. The hot gas vessel 284 receives hot incoming atmospheric gas during a refueling retro maneuver after it is decelerated inside the MHD system 248 operating as a generator. The incoming gas is withdrawn from the hot gas vessel 284 by a plurality of high temperature thermally insulated conduits 286 which feed the gas to the first high temperature space radiator 214.

Still another variation involves keeping the combined MHD generator/accelerator regenerative propulsion system but replacing the superconducting energy storage system with a high power nuclear-electric power plant similar to the one described in the first embodiment. Instead of saving the electrical energy generated during the retro maneuvers, it could be converted into radiant thermal energy and radiated away into space.

Another variation of the preferred embodiment described above can be achieved by replacing the ECR accelerator 188 with a plurality of MHD accelerators or MPD accelerators. (See, "Meassured Performance Of A Multimegawatt MPD Thruster," *Journal of Spacecraft and Rockets,* Vol. 20, No. 3, May–June 1983, pp. 299–304, by R. L. Burton et a.l.) Many different design variations and combinations of design variations are possible. Since there are many high specific impulse rocket propulsion systems (such as nuclear rocket engines, microwave rocket engines, laser rocket engines, ion rocket engines, etc.) that, in principle, could be used for providing accelerating forward propulsion, it should be understood that the present invention is not limited by any one system or any class of systems. (See for example my U.S. Pat. No. 3,825,211 entitled "Laser Rocket" filed June 19, 1972.)

It should also be pointed out and emphasized that there are many different power generating systems that could be used for generating electric Power on-board the vehicle besides nuclear-electric power systems. Solar-electric power systems could be used. Nuclear-thermionic electric generators could be used. The superconducting energy storage system used in the regenerative embodiments could be replaced with inertial energy storage systems (i.e., flywheels) or battery storage systems, etc.

Finally, it should be pointed out and emphasized that the fundamental operating principles of the proposed self-refueling propulsion system could be applied to aircraft moving through the atmosphere at sub-orbital velocities. In principle, it could even be applied to submarines moving under water through a fluid medium. The essential and most basic operating principle that is new to the art of propulsion systems is a system for generating decelerating retro thrust by moving through a medium and scooping up and ingesting a portion of the medium. This basic operating principle is illustrated schematically in FIG. 15 wherein the retro propulsion system comprises an inlet nozzle 288 for scooping up and ingesting a medium 290 which a vehicle 292 (on which the retro propulsion system 288 is mounted) is passing through. Although a means 294 must be provided for storing the ingested medium inside the vehicle 292, it does not represent part of the basic thrust generating retro propulsion system. The retro thrust generating system (i.e., the retro propulsion system) is only represented by the intake nozzle 288. The medium could be gaseous or liquid or a combination of both.

From the foregoing descriptions, it will thus be evident that the present invention has provided a vastly improved method and system for achieving economical space transportation. As various changes and modifications can be made in the ab.ove construction and operating method without departing from the spirit or scope of the invention, it is intended that all matter contained in the above description or shown in the accompanying drawings should be interpreted as illustrative and not in a limiting sense.

What is claimed is:

1. A propulsion system for generating decelerating retro thrust on a space vehicle moving in the vicinity of a celestial body having an atmosphere comprising:
   a hypervelocity diffuser mounted on said space vehicle for ingesting atmospheric gas at orbital velocities thereby converting the directed kinetic energy of the incoming atmospheric gas stream relative to the space vehicle into thermal energy and generating decelerating retro thrust; and
   means for cooling said ingested gas by radiative heat transfer into space.

2. A propulsion system as set forth in claim 1 wherein said hypervelocity diffuser has a sufficient cross section that the vehicle is decelerated primarily by transferring momentum from said vehicle to said ingested atmospheric gas.

3. A propulsion system as set forth in claim 1 further comprising means for storing a portion of said ingested atmospheric gas onboard said vehicle.

4. A propulsion system as set forth in claim 3 further comprising means for generating accelerating thrust when said vehicle is moving substantially outside of said atmospheric gas by expelling a portion of said ingested gas at high velocity.

5. A propulsion system as set forth in claim 1 wherein the hypervelocity diffuser is tapered for ingesting atmospheric gas at an ingestion velocity substantially equal to the vehicle's orbital velocity.

6. A propulsion system as set forth in claim 5 further comprising:
   means for expelling a portion of said thermal energy from said propulsion system by radiated heat transfer into space at optical wavelengths.

7. An apparatus as set forth in claim 5 further comprising means for converting a portion of the directed kinetic energy of said ingested atosphere into electrical energy.

8. A propulsion system as set forth in claim 3 wherein said storing means comprises:
   means for cooling said ingested atmosphere;
   means for liquefying said cooled ingested atmosphere; and
   storage vessel means for storing said liquefied ingested atmosphere.

9. A propulsion system as set forth in claim 4 wherein said means for generating accelerating thrust expels said atmospheric gas at a velocity exceeding the maximum ingestion velocity.

10. A propulsion system as set forth in claim 4 wherein the ingested atmospheric gas is composed of a mixture of various component gases and further comprising:
    means for separating said ingested atmosphere into its component gases, and
    means for storing said separated component gases in separate storage vessel means.

11. A propulsion system as set froth in claim 10 wherein said expulsion system comprises means for expelling only one of said component gases for generating propulsive thrust while moving outside an atmosphere in a vacuum environment.

12. An apparatus as set forth in claim 4 wherein said ingested atmospheric gas is air further comprising:
    means for extracting nitrogen from said ingested air;
    means for extracting oxygen from said ingested air;
    means for utilizing said extracted nitrogen as a propulsive working fluid for generating propulsive thrust by accelerating and expelling a portion of said nitrogen from said vehicle while said vehicle is moving in a vacuum environment outside any atmosphere; and
    means for accumulating said extracted oxygen for use as an oxidizer in a chemical rocket engine.

13. An apparatus as set forth in claim 7 further comprising:
    means for storing said electrical energy derived from said conversion of directed kinetic energy into electrical energy; and
    means for using said stored electrical energy to accelerate and expel a portion of said ingested atmospheric gas for generating propulsive accelerating or decelerating thrust while said vehicle is moving in a vacuum environment outside any atmosphere.

14. A decelerating propulsion system for generating retro thrust for a space vehicle comprising:
    a hypervelocity diffuser nozzle for scooping up and ingesting atmospheric gas surrounding a celestial body at orbital velocities; and
    means for expelling thermal energy generated by atmospheric gas passing through said diffuser by radiative heat transfer.

15. A system as set forth in claim 14 further comprising means for storing a portion of said ingested atmospheric gas on-board said space vehicle.

16. A system as set forth in claim 15 wherein said storing means comprise
    means for cooling ingested atmospheric gas;
    means for liquefying said cooled ingested atmospheric gas; and
    means for storing said liquefied ingested atmospheric gas.

17. A system as set forth in claim 14 further comprising means for generating accelerating or decelerating propulsive thrust while said vehicle is moving in a substantially vacuum environment by accelerating and expelling a portion of said ingested atmospheric gas.

18. A system as set forth in claim 17 further comprising:
    means for generating energy;
    means for accelerating a portion of said ingested atmospheric gas by converting a portion of the energy obtained from said energy generating means into directed kinetic energy of said atmospheric gas;
    an outlet duct means; and means for expelling said accelerated atmospheric gas through said outlet duct means.

19. A system as set forth in claim 18 wherein said means for accelerating said gas accelerates said gas to an expulsion velocity exceeding the maximum ingestion velocity so that the amount of gas expelled from the vehicle is substantially replenished by the gas ingested into the vehicle thereby enabling the propulsion system to be self-refueling.

20. A system as set forth in claim 17 wherein the ingested atmospheric gas is composed of a mixture of various component gases and further comprises:
   means for separating said ingested atmospheric gas into its component gases; and
   means for storing said separated component gases in separate storage vessel means.

21. A system as set forth in claim 20 wherein said expulsion system comprises means for expelling only one of said component gases for generating propulsive thrust while moving outside an atmosphere.

22. A propulsion system for a space vehicle moving in the vicinity of Earth comprising:
   an inlet duct means for scooping up and ingesting a portion of the Earth" atmosphere at orbital velocities for generating decelerating retro propulsive thrust;
   means for expelling thermal energy from said ingested air by radiative heat transfer into space;
   means for storing a portion of said ingested air on-board said space vehicle;
   means for exracting nitrogen from said ingested air;
   means for extracting oxygen from said ingested air;
   means for utilizing said extracted nitrogen as a propulsive working fluid for generating propulsive thrust by accelerating and expelling a portion of said nitrogen from said vehicle while said vehicle is moving in a vacuum environment outside the Earth's atmosphere; and
   means for accumulating said extracted oxygen for use as an oxidizer in a chemical rocket engine.

23. A propulsion system for decelerating a space vehicle moving at orbital velocity near a celestial body having an atmosphere comprising:
   a hypervelocity diffuser having a sufficient opening for scooping up and ingesting a portion of said atmosphere that is substantially at rest with respect to said celestial body that the deceleration is generated primarily by transferring momentum from said vehicle is to said injested atmosphere; and
   means for cooling said ingested atmposhere by radiative heat transfer.

24. A propulsion system for propelling space vehicles comprising:
   a hypervelocity diffuser means for generating decelerating retro thrust by ingesting atmospheric gas at orbital velocities from a celestial body having an atmosphere;
   means for expelling heat energy from said ingested gas via radiative heat transfer at optical wavelengths;
   means for storing a portion of said ingested atmospheric gas;
   exhaust duct means; and
   means for accelerating a portion of said ingested atmospheric gas and expelling said gas out of said exhaust duct means for generating accelerating or decelerating propulsive thrust when said vehicle is moving outside an atmosphere in a vacuum environment.

25. A propulsion system as set forth in claim 24 wherein said accelerating means accelerates said gas to an expulsion velocity exceeding the maximum ingestion velocity so that said propulsion system is self-refueling.

26. A propulsion system as set forth in claim 24 wherein said decelerating thrust is generated by transferring momentum from said vehicle to said ingested atmospheric gas.

27. A propulsion system as set forth in claim 24 further comprising means for generating electrical energy by means of a nuclear-electric power plant and further comprising means for using asid electrical energy for accelerating said expelled gas.

28. A propulsion system as set forth in claim 24 wherein said diffuser has a maximum transverse cross-sectional diameter exceeding the maximum transverse cross-sectional diameter of said space vehicle.

29. A propulsion system as set forth in claim 24 wherein said diffuser means has an annular transverse cross section and further comprising:
   an annular throat extending around the circumferential periphery of said vehicle;
   an annular hot gas chamber communicating with said annular throat;
   transparent wall means bounding said hot gas chamber for radiating thermal energy at optical wavelengths; and
   reflector means mounted on a portion of said transparent wall means for reflecting radiant thermal energy away from said vehicle into space.

30. A propulsion system as set forth in claim 29 further comprising means for cooling said transparent walls and said reflecting means.

31. A propulsion system as set forth in claim 29 further comprising:
   radiator means; and
   means for withdrawing gas from said chamber means and feeding it into said radiator means for cooling.

32. A propulsion system as set forth in claim 31 further comprising:
   means for withdrawing said gas from said radiator means;
   means for liquefying said gas withdrawn from said radiator means; and
   means for storing said liquefied gas.

33. A propulsion system as set forth in claim 24 wherein said means for accelerating said gas comprises:
   means for generating electric current;
   means for converting said electric current into microwaves; and
   means for converting the energy of said microwaves into directed kinetic energy of the expelled atmospheric gas by electron cyclotron resonance.

34. A propulsion system as set forth in claim 33 wherein said means for converting microwave energy into directed kinetic energy of the expelled gas by electron cyclotron resonance comrpises:
   a superconducting solenoid having a longitudinal central axis and generating a magnetic field;
   a phased array microwave transmitter energized by a plurality of microwave generators;
   said phased array microwave transmitter projecting a coherent microwave beam along the longitudinal central axis of said superconducting solenoid said microwave beam having an electron cyclotron resonant frequency with some region of the magnetic field of said superconducting solenoid;

means for introducing said atmospheric gas near the end of said super conducting solenoid farthest from said phased array; and wherein said gas becomes ionized by absorbing a small portion of said microwave energy thereby releasing free electrons that pass into said resonant region where they absorb almost all of the remaining microwave energy by being accelerated into high energy electron cyclotron orbits thereby making them strong magnetic dipoles which are accelerated away from the end of said solenoid by magnetic repulsion forces thereby creating an electrostatic charge separation with respect to the remaining positively charged ions that are accelerated after the electrons by electrostatic forces.

35. A propulsion system as set forth in claim 24 further comprising an MHD generator means connected to said inlet duct means adapted for decelerating said ingested gas by magnetic forces by converting a portion of the kinetic energy of said gas into electrical energy.

36. A propulsion system as set forth in claim 35 further comprising means for storing said electrical energy generated from said conversion of kinetic energy.

37. A propulsion system as set forth in claim 36 wherein said stored electrical energy is used for accelerating and expelling a portion of said ingested gas for generating said propulsive thrust.

38. A propulsion system as set forth in claim 37 comprising means for converting said MHD generator into an MHD accelerator and means for accelerating a portion of said ingested gas by said MHD accelerator for generating propulsive thrust.

39. A propulsion system as set forth in claim 24 further comprising exhaust duct means for exhausting a portion of said ingested atmospheric gas while said gas is entering said diffuser means.

40. A system for decelerating a space vehicle moving in the vicinity of a celestial body having an atmosphere comprising:

a hypervelocity diffuser for scooping up and ingesting a portion of said atmosphere when said vehicle dips into the tenuous upper reaches of said atmosphere thereby generating decelerating retro thrust by transferring momentum from said vehicle to said ingested atmosphere; and means for expelling thermal energy generated by said gas passing through said diffuser by radiative heat transfer into space.

41. A system as set forth in calim 40 further comprising:

storage tank means for storing a portion of said ingested atmospheric gas onboard said space vehicle; and means for generating accelerating propulsive thrust by accelerating and expelling a portion of said ingested and stored atmospheric gas when said vehicle is moving outside said atmosphere.

42. A system as set forth in claim 40 wherein said means for decelerating scooped-up atmospheric gas comprises means for converting the kinetic energy of said scooped-up gas into electrical energy means of an MHD generator and further comprises means for operating said MHD generator as an MHD accelerator for accelerating and expelling previously scooped up and stored atmospheric gas for generating accelerating propulsive thrust.

43. A system as set forth in claim 42 further comprising means for storing said electrical energy generated from said MHD generator and means for using said stored electrical energy for operating said MHD accelerator.

44. A system as set forth in claim 43 wherein said means for storing said electrical energy comprises a superconducting energy storage system.

45. A propulsion system for decelerating a space vehicle moving the in the vicinity of a celestial body having an atmosphere comprising:

a hypervelocity diffuser for ingesting a portion of said atmosphere at orbital velocity; and wherein said diffuser has at least a portion of its walls transparent to optical radiation such that said atmosphere passing through said diffuser can be cooled by radiating thermal energy through said transparent walls directly into space.

46. A propulsion system as set forth in claim 45 further comprising means for liquefying and storing said ingested atmospheric gas on-board said vehicle.

47. A propulsion system as set forth in claim 46 further comprising means for accelerating said space vehicle by accelerating and expelling a portion of said stored atmospheric gas when said vehicle is moving in space outside an atmosphere.

48. A propulsion system as set forth in claim 47 wherein said means for accelerating said space vehicle comprises means for expelling a portion of said stored atmospheric gas with a velocity greater than the maximum ingestion velocity so that the gas expelled is replenished by the gas ingested thereby enabling the propulsion system to be self-refueling.

49. A propulsion system as set forth in claim further comprising:

a hot gas chamber means communicating with the throat of said diffuser;

said hot gas chamber means having at least a portion of its walls transparent there by enabling incandescent hot gas passing through said chamber means to radiate thermal energy at optical wavelengths through said walls directly into space without substantially heating said walls; and means for cooling said hot gas chamber.

50. A propulsion system as set forth in claim 49 further comprising:

means for withdrawing gas after passing through said hot gas chamber means;

radiator means;

means for passing said gas withdrawn from said hot gas chamber means through said radiator means;

means for withdrawing gas passing through said radiator means; and means for liquefying gas withdrawn from said radiator means.

51. A propulsion system as set forth in claim 47 wherein said celestial body is the Earth and said ingested atmosphere is air further comprising:

means for separating oxygen from said ingested air;

means for separting nitrogen form said ingested air;

means for liquefying and storing said separated oxygen and nitrogen in separate storage vessel means;

means for accelerating and expelling said nitrogen for generating propulsive thrust; and means for accumulating and utilizing said oxygen as an oxidizer for a chemical rocket engine.

52. A propulsion system as set forth in claim 45 wherein said diffuser has an inlet transverse cross-sectional area equal to or exceeding the maximum transverse cross-sectional area of said space vehicle such that said diffuser shields the body of said space vehicle from the moving hypervelocity atmosphere while said vehicle is traversing through said atmosphere.

53. A propulsion system as set forth in claim 47 further comprising:
an energy generating system for generating energy on-board said space vehicle;
means for converting a portion of said energy into directed kinetic energy of said expelled atmospheric gas for generating propulsive thrust;
retractable radiator means mounted on-board said vehicle adapted for radiating waste heat generated from said energy generating system;
means for retracting said radiator means into the body of said space vehicle while said space vehicle is traversing through said atmosphere to protect said radiator from the moving hypervelocity atmospheric gas; and
means for extending and maintaining said radiator means while operating said energy generating system.

54. A propulsive system as set forth in claim 53 further comprising:
retractable radiator means mounted on-board said vehicle adapted for radiating waste heat generated from said means for converting said energy into directed kinetic energy of said expelled gas;
means for retracting said radiator means into the body of said space vehicle while said space vehicle is traversing through said atmosphere to protect said radiator from the moving hypervelocity atmospheric gas; and
means for extending and maintaining said radiator means while operating said means for accelerating said gas and generating said propulsive thrust.

55. A propulsion system for propelling a space vehicle utilizing atmospheric gas as propulsive working fluid comprising:
exhaust duct means;
means for expelling a portion of atmospheric gas stored onboard said space vehicle through said exhaust means at high velocity for generating accelerating propulsive thrust;
a hypervelocity diffuser for ingesting atmospheric gas at orbital velocity from the atmosphere of a nearby celestial body for generating deceleating retro thrust while simultaneously replenishing the vehicle's supply of onboard atmospheric working fluid; and
means for cooling said ingested atmospheric gas by radiative heat transfer.

56. A propulsion system for decelerating a space vehicle moving at orbital velocity in the vicinity of a celestial body having an atmosphere comprising:
means for ingesting a portion of said atmosphere into said space vehicle, thereby decelerating said vehicle by transferring momentum from said vehicle to said ingested atmosphere, said means comprising diffuser nozzle means for scooping up and converting directed kinetic energy of said incoming atmospheric gas into thermal energy; and
means for expelling said thermal energy from said space vehicle by radiative heat transfer into space.

57. A propulsion system as set forth in claim 56 further comprising means for accelerating said space vehicle by expelling a portion of said ingested atmospheric gas from said vehicle at high velocity.

58. A propulsion system for generating decelerating propulsive thrust on a space vehicle comprising a hypervelocity diffuser for scooping up and decelerating atmospoheric gas moving with a relative velocity exceeding 7 km per second and means for cooling said ingested gas by radiative heat transfer.

59. A propulsion system for generating decelerating propulsive thrust on a space vehicle comprising:
means for scooping up and ingesting natural atmospheric gas at orbital velocities, said means comprising a hypervelocity diffuser with an inlet diameter equal to or exceeding the maximum transverse diameter of said space vehicle; and
means for cooling said ingested gas by radiative heat transfer.

60. A propuslion system for decelerating a space vehicle moving the vicinity of Earth comprising:
a hypervelocity diffuser nozzle for scooping up and ingesting gas substantially at rest in the Earth's atmosphere; and
means for cooling said ingested gas by radiative heat transfer.

61. A propulsion system for simultaneously decelerating a space vehicle and collecting atmosphere gas at orbital velocities comprising:
a hypervelocity diffuser for ingesting atmospheric gas at orbital velocities; and
means for cooling said ingested gas by radiative heat transfer.

* * * * *